US006388672B1

(12) United States Patent
Ide et al.

(10) Patent No.: US 6,388,672 B1
(45) Date of Patent: *May 14, 2002

(54) GRAPHIC TRANSLATE ENGINE, FLOATING POINT ARITHMETIC UNIT AND FLOATING POINT MULTIPLY-ADD CALCULATION UNIT

(75) Inventors: Nobuhiro Ide; Atsushi Kunimatsu; Maki Ueno, all of Tokyo (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/792,022

(22) Filed: Jan. 31, 1997

(30) Foreign Application Priority Data

| Feb. 2, 1996 | (JP) | 8-017799 |
| Feb. 6, 1996 | (JP) | 8-020185 |

(51) Int. Cl.[7] .................................................. G09G 5/00
(52) U.S. Cl. ........................................ 345/544; 345/538
(58) Field of Search .............................. 345/198, 505, 345/508, 523, 524, 507, 509, 561, 562, 563, 535, 536, 537, 538, 540, 544; 708/395

(56) References Cited

U.S. PATENT DOCUMENTS

| 4,739,474 A | * 4/1988 | Holsztynski | 364/200 |
| 4,914,729 A | * 4/1990 | Omori et al. | 345/418 |
| 5,136,664 A | * 8/1992 | Bersack et al. | 382/304 |
| 5,170,468 A | * 12/1992 | Shah et al. | 345/537 |
| 5,265,197 A | * 11/1993 | Kondo | 395/120 |
| 5,384,912 A | * 1/1995 | Ogrinc et al. | 395/164 |
| 5,410,649 A | * 4/1995 | Gove | 395/161 |
| 5,457,775 A | * 10/1995 | Johnson, Jr. et al. | 345/441 |
| 5,774,133 A | * 6/1998 | Neave et al. | 345/505 |
| 5,784,076 A | * 7/1998 | Crump et al. | 345/519 |
| 5,850,489 A | * 12/1998 | Rich | 382/304 |

OTHER PUBLICATIONS

M. Morris Mano, Computer System Architecture, 1993, 3rd edition pp. 83–84, 1993.*

Mitsuya, E., et al., "An Architecture of a Processing Unit for a High–Speed Image Generation System", pp. 9–pp. 9–16 (1996).

Yoshida, M., et al., "A Dedicated Graphics Processor SIGHT–2", *IEICE* Computer Architecture, vol. 77–6, pp. 43–50 (1989).

Clark, J. H., "The Geometry Engine: A VLSI Geometry System for Graphics", ACH Computer Graphics, vol. 16, No. 3, pp. 127–133 (1982).

* cited by examiner

*Primary Examiner*—Bipin Shalwala
*Assistant Examiner*—Vanel Frenel
(74) *Attorney, Agent, or Firm*—Foley & Lardner

(57) ABSTRACT

An internal memory section is divided into plural memory blocks. During a period of time, a relevant memory block of the internal memory section is connected to an external memory unit, while another memory block thereof is connected to a data holding section. During a succeeding period of time, the relevant memory block is connected to the data holding section, while the other memory block is connected to the external memory unit. Data exchange between the data holding section and the external memory unit via the internal memory section is performed while the alternative connection is repeated.

9 Claims, 16 Drawing Sheets

EXPONENT PART
ARITHMETIC UNIT

MANTISSA
ARITHMETIC UNIT

FIG.4A
PRIOR ART

```
CALCULATION OF INNER PRODUCT:
                    A×B+D×E+F×G
MUL   A,B,C   /*   C← A×B      */
MAC   D,E,C   /*   C← D×E+C    */
MAC   F,G,C   /*   C← F×G+C    */
```

FIG.4B
PRIOR ART

```
MUL A,B,C  | F | D | E1| E2 |WB|
                              ↓ BYPASS OF CALCULATION RESULTS
MAC D,E,C           | F | D | E1| E2 |WB|
                                       ↓ BYPASS OF CALCULATION
MAC F,G,C                    | F | D | E1| E2 |WB|     RESULTS
```

ADDER-SUBTRACTER

MULTIPLIER

FIG.6A
PRIOR ART

```
MUL  A,B,C    /*  C ← A×B      */
MAC  D,E,C    /*  C ← D×E+C    */
MAC  F,G,C    /*  C ← F×G+C    */
```

FIG.6B
PRIOR ART

```
MUL A,B,C  | F | D | E1 | E2 |WB|
                        ↓ BYPASS OF CALCULATION RESULTS
MAC D,E,C    | F | — | D | E1 | E2 |WB|
                                ↓ BYPASS OF CALCULATION RESULTS
             | F | D | E1 | E2 |WB|
MAC F,G,C    | F | D | E1 | E2 |WB|     ↓ BYPASS OF
                           ↓              ↓ CALCULATION RESULTS
                     | F | D | — | E1 | E2 |WB|
```

FIG.7A
PRIOR ART

```
MUL  A,B,C    /*  C ← A×B     */
MUL  D,E,F    /*  F ← D×E     */
MUL  G,H,I    /*  I ← G×H     */
ADD  C,F,J    /*  J ← C×F     */
ADD  I,J,K    /*  K ← I×J     */
```

FIG.7B
PRIOR ART

```
MUL A,B,C  | F | D | E1 | E2 |WB|
MUL D,E,F      | F | D | E1 | E2 |WB|
MUL G,H,I          | F | D | E1 | E2 |WB|
ADD C,F,J              | F | D | E1 | E2 |WB|
ADD I,J,K                  | F | D |    | E1 | E2 |WB|
```

MULA   A,B,C    /*   C ← A×B      */
MAC    D,E,C    /*   C ← D×E+C    */
MAC    F,G,C    /*   C ← F×G+C    */
```

FIG.17B

```
MULA      | F | D | E1 | E2 | WB |
                      ↓ BYPASS OF CALCULATION
                        INTERMEDIATE VALUE
MAC       | F | D | E1 | E2 | WB |
                      ↓ BYPASS OF CALCULATION
                        INTERMEDIATE VALUE
MAC       | F | D | E1 | E2 | WB |
```

GRAPHIC TRANSLATE ENGINE, FLOATING POINT ARITHMETIC UNIT AND FLOATING POINT MULTIPLY-ADD CALCULATION UNIT

BACKGROUND OF THE INVENTION

1. Technical Field to Which the Invention Belongs

The present invention relates to a graphic translate engine and particularly relates to a graphic translate engine for performing geometrical processing used in computer graphic processing, etc.

The present invention also relates to a floating point multiply-add calculation unit and particularly relates to a floating point multiply-add calculation unit capable of performing processing about a continuous multiply-accumulation operation in a dependent relation at high speed.

2. Prior Art

Recently, computer graphics (CG) have become very important by a rapid spread of multimedia, thoroughness of WYSWYG(What You See What You Get), spreads of a high grade GUI (Graphic User Interface) and a TV game using graphic, etc. In particular, requirements for three-dimensional computer graphics (3D-CG) as an application used in a high performance processor, especially requirements for a moving image of a high quality have been increased by a rapid spread of personal computers to homes, spread of a TV game machine. It is necessary to process one frame for 1/30 to 1/60 second so as to process the moving image. Accordingly, a large computing amount and computing ability are required in this processing.

Graphic processing using a computer is mainly divided into two phases, namely, geometrical processing and rendering processing. In the geometrical processing, processing for generating an image displayed on a CRT is geometrically performed by a coordinate transformation such as a movement of modeled data themselves, a movement conformed to a view point, etc. and projection. In the rendering processing, an image is really drawn on the CRT. A matrix calculation and a vector calculation are made in the geometrical processing as a phase for performing transformation processing of a geometrical graphic model such as a coordinate transformation, a view point transformation, etc. and light irradiating processing. Therefore, the calculation of an inner product is used in many cases. The coordinate transformation is variously introduced in detail in literatures of computer graphics.

FIG. 1 shows the construction of a typical graphic translate engine (GTE). The GTE is constructed by an arithmetic unit section 801, a register file 802, an input output interface 804, etc. The arithmetic unit 20 section 801 is a data path for making a matrix calculation and is constructed by an adder-subtracter, a multiplier, a divider, a square root extracting arithmetic unit, etc. The input output interface 804 is an interface of an external memory unit, and the register file 802 and the arithmetic unit 801.

1: Data Transfer

Data of 3D computer graphics depend on modeling, but are generally treated as a set of independent triangles. Three vertexes of an independent triangle are represented by homogeneous coordinates and are stored to the external memory unit.

No memory unit having a large capacity is mounted to the interior of the conventional graphic translate engine in many cases. Therefore, graphic data are read from the external memory unit and are sent to a data path such as an arithmetic unit, a register file, etc. through a FIFO, etc. In this method, a fluctuation of a data transfer speed caused by a latency of a bus, an access speed of the memory unit, etc. is hidden by using the FIFO as a buffer for an input or an output. However, this fluctuation is rate-determined by the access speed of the memory unit and a responsive speed of the bus so that no sufficient transfer band width can be secured.

In contrast to this, there is a system in which an internal memory unit is mounted to a certain extent and data are taken in at a high speed and a calculation is made by a DMA (Direct Memory Access) system. In an arithmetic unit of such a system, the internal memory unit is adapted to be accessed by the external memory unit, an internal arithmetic unit and a register file. Therefore, it is difficult to execute data transfer and an arithmetic operation in parallel with each other. Accordingly, two phase processings of data transfer and data processing are alternately performed so that no processings can be efficiently executed as a pipeline. Data are transferred at a high speed by the DMA, but no entire processing can be sufficiently performed at a high speed.

It is considered that the transfer and arithmetic operations are executed in parallel with each other by a similar construction and a memory unit having plural ports is mounted to increase processing efficiency. However, in this case, control greatly becomes complicated in mediation of an access conflict to the same memory unit, etc., and cost of the memory unit is also increased. Accordingly, no memory unit having a large capacity capable of obtaining sufficient processing performance can be mounted to the graphic translate engine.

2: Transformation Processing

Here, an example of a simple perspective transformation is shown before a conventional example is shown. The perspective transformation is a transformation for projecting a three-dimensional graphic model onto two dimensions in consideration of perspective. Assuming that an input (x, y, z, 1) is a vertex coordinate to be transformed, the perspective transformation is performed on the basis of the following formulas (1) to (3), and X and Y coordinates on a screen are outputted after (X, Y) perspective transformation.

$$(x', y', w') = (x, y, z, 1) \times \begin{pmatrix} a, b, c \\ d, e, f \\ g, h, i \\ j, k, l \end{pmatrix} \quad (1)$$

$$= (ax + dy + gz + j, bx + ey + hz + k, cx + fy + iz + 1)$$

$$W = 1/w' \quad (2)$$

$$(X, Y) = (x', y') \times W \quad (3)$$

Thus, in the perspective transformation, it is necessary to make a multiply-accumulation operation caused by a matrix calculation and further make a divisional calculation by using results of this multiply-accumulation operation. Calculations with respect to respective coordinates of x, y, z and w are approximately the same and are independent of each other so that there are features in that the perspective transformation has high parallel and symmetrical properties with respect to these calculations.

In the typical conventional example of FIG. 1, one multiply-add calculation unit and one adder-subtracter unit are mounted. In such a transformation processor, only the above-mentioned arithmetic operations can be sequentially processed by a simple pipeline processing. Accordingly, the features of the high parallel and symmetrical properties with respect to calculations are simply used only in scheduling instructions.

FIG. 2 shows a construction to which the features with respect to calculations are applied. In this construction, a register file and a multiply-add calculation unit are set to correspond to each of coordinates of x, y, z and w so that these calculations can be independently made. Namely, ax+dy+gz+j, bx+ey+hz+k and cx+fy+iz+l in the formula (1) are respectively allocated to first, second and third arithmetic units and are independently calculated. Thus, a high speed arithmetic calculation can be performed in consideration of arithmetic characteristics. However, in such a construction, no calculations of the above formulas (2) and (3) can be efficiently made. It is sufficient to make a divisional calculation once. Accordingly, while the divisional calculation is made, no plural arithmetic units can be effectively utilized. Further, since the divisional calculation has a large latency in comparison with the other arithmetic calculations, no expensive plural arithmetic units can be particularly operated effectively. Accordingly, in such a construction, no sufficient performance corresponding to invested hardware can be obtained.

3: Light Irradiating Processing

Light irradiating processing is performed with respect to an object to obtain an image of a real feeling. In the following example, a color is represented by synthesis of red (R), green (G) and blue (B) and the light irradiating processing is set to be performed by each of these colors. The calculation of brightness depends on modeling of light, but is generally made as follows. Namely, a vertex color is calculated by adding reflection of light from a material at its vertex, whole environmental light enlarged and reduced in size by environmental optical characteristics of the material at its vertex, and influences of diffused light, a mirror surface light and environmental light suitably damped from all light sources. This light irradiating processing is schematically shown in the following description.

Processing Start (a) A light beam and a normal line at the vertex are normalized if necessary.

(b) Radiated light and environmental light in a light source nonexistent state are set to constants.

(c) The environmental light, diffused light and mirror surface light every light source are calculated with respect to the individual light source and are added together in the following procedures.

(i) A vector (a light incident vector: a light direction vector) from the vertex to the light source is calculated.

(ii) The distance between the vertex and the light source is calculated from this vector, and the vector from the vertex to the light source is also normalized.

(iii) A damping factor is calculated from the distance.

(iv) An inner product (cos θ) of the light source vector and the vertex normal line is calculated.

(v) A spot light effect is considered.

(vi) An influence of the environmental light every light source is considered on the basis of the following formula (4).

Environmental influence=light source environmental coefficient× substance (vertex) environmental coefficient     (4)

(vii) An influence of the diffused light every light source is considered on the basis of the following formula (5).

Diffusive influence=(light source vector·normalized line at vertex)×light source diffusion coefficient×substance (vertex) diffusion coefficient     (5)

(viii) An influence of the mirror surface light every light source is calculated as follows.

Assuming that L is a unit vector in an incident direction of light and V is a unit vector in a viewing direction. Also, N is a unit vector in a normal line direction and θ is an incident angle. Further, α is an angle formed between a viewing vector and a reflecting vector. In this case, the following relation of formula (6) is formed.

$$(L-V) \cdot N = L \cdot N - V \cdot N \quad (6)$$
$$= \cos\theta - \cos(\theta + \alpha)$$
$$\approx -\cos\alpha$$
$$= \cos\alpha$$

When the viewing vector is calculated from a vertex vector, S(sx, sy, sz) is calculated from the following formulas (7) to (9) and an inner product of S and norm is calculated.

$$sx=lx-vx \quad (7)$$
$$sy=ly-vy \quad (8)$$
$$sz=lz-vz \quad (9)$$

When it is assumed that the viewing vector is compulsorily directed to a −Z axis direction, S(sx, sy, sz) is calculated by the following formulas (10) to (12).

$$sx=lx \quad (10)$$
$$sy=ly \quad (11)$$
$$sz=lz+1 \quad (12)$$

The result of the inner product is raised to mirror surface coefficient Shininess [i] power every light source i so that spec_coef is calculated.

Accordingly, the influence of the mirror surface light every light source is calculated by the following formula (13).

Mirror surface influence=spec_coef×light source mirror surface coefficient×substance (vertex) mirror surface coefficient     (13)

(ix) All the influences are calculated by the following formula (14).

All the influences=damping factor×spot light effect×(environmental light influence+diffused light influence+mirror surface light influence)     (14)

(d) All the influences of the light source i are added to red (R), green (G) and blue (B).

(e) After the influences of all the light sources are added, R, G and B are clamped between 0 and 1.

Processing Termination

As mentioned above, each of the calculations in the light irradiating processing depends on modeling of light. Therefore, these calculations are slightly different from each other in detail. However, it is important here that brightness is defined by each of values of [0,1] and a calculated brightness is clamped to each of these values. Here, [0,1] shows value n in a range of 0≦n≦1.

In a conventional arithmetic unit, as shown in the following processing flow, a brightness value and '0' and '1' are compared with each other by a comparison instruction, and a branching operation is performed by a conditional branching instruction if necessary. Thus, the clamping processing is performed by outputting constants '0' and '1'.

/* Clamping flow of R, G and B values */

If (R<0.0) {R=0.0}

If (R>1.0) {R=1.0}

If (G<0.0) {G=0.0}

If (G>1.0) {G=1.0}

If (B<0.0) {B=0.0}

If (B>1.0) {B=1.0}

In such a method, execution of the branching instruction is caused in clamping so that a disturbance of an arithmetic pipeline is caused. In the calculation of brightness, the three primary colors of R, G and B are calculated at each of vertexes constituting a picture so that a large processing amount is required. Accordingly, in the above-mentioned conventional flow, the pipeline disturbance is often caused so that processing performance of the brightness calculation is greatly deteriorated.

As mentioned above, there were the following problems in the conventional graphic translate engine (GTE).

(1) No graphic data to be transformed can be efficiently transferred to an arithmetic unit and a register file.

(2) It is impossible to efficiently execute the inner product calculation caused by a matrix calculation for performing the perspective transformation and the divisional calculation by 'depth'.

(3) It is impossible to execute the clamping processing of R, G and B brightnesses in the light irradiating processing at high speed.

The geometrical processing in the computer graphics (CG) is a phase for performing transforming processing of a geometrical graphic model such as a coordinate transformation, a perspective transformation, etc and for performing light irradiating processing. Therefore, in these processings, a matrix calculation and a vector calculation are made so that calculations of inner products are used in many cases. The calculations of inner products are similarly used in many cases in a numerical calculation in conventional science and technology calculations except for the above 3D-CG processing.

Accordingly, realization of a high speed multiply-add calculation unit is desired by the above requirements. The construction of a conventional floating point multiply-add calculation unit will next be explained concretely. A method for constructing the multiply-add calculation unit is generally divided into two methods.

In a first constructing method of the conventional floating point multiply-add calculation unit, the multiply-add calculation unit is directly constructed. FIG. 3 shows a block diagram of a mantissa arithmetic unit and an exponent part arithmetic unit in the first conventional floating point multiply-add calculation unit. The mantissa arithmetic unit is constructed by multiplication trees 301, 302 for calculating a product of first and second operands, a bidirectional shifter 303 for performing a digit alignment of a third operand, adders 304, 305 for calculating a sum of a multiplied result and a digit-aligned result (i.e. multiply-add), a normalizing circuit 307 for normalizing results of the multiply-accumulation operation obtained by the adders, and a leading zero anticipation circuit 306. The exponent part arithmetic unit is constructed by an adder 308 for calculating the value of an exponent part of the product of the first and second operands (i.e. a sum of exponent parts), a selecting circuit 318 for calculating an exponent part (a larger value of an exponent part of the third operand and the exponent part of the product of the above first and second operands) of a sum of the third operand and the product of the first and second operands (i.e. multiply-add), a subtracter 309 for calculating an aligned digit number (the difference between the exponent part of the third operand and the exponent part of the product of the above first and second operands), and a subtracter 312 for performing normalization.

This arithmetic unit is an arithmetic unit of four operands in total constructed by three source operands and one destination. The multiply-accumulation operation is executed as follows. Namely, the first and second operands are inputted to the multiplication trees 301 and 302 for calculating the product of the first and second operands and are multiplied. The digit alignment of the third operand is performed by the bidirectional shifter 303 in parallel with this multiplying processing. The number of shifts on a left-hand or light-hand side is calculated as the difference between an exponent sum of the first and second operands and the exponent of the third operand. A sum of the product of the first and second operands and a digit-aligned result of the third operand(multiply-add) is calculated by the adders 304 and 305. The multiply-add calculation result obtained by the adders is normalized by the normalizing circuit 307.

A series of these processings is executed by pipeline processings at two stages. Accordingly, calculation results of a certain operand can be used as an operand in the next arithmetic operation only after two clocks. Namely, an arithmetic operation having a dependent relation can be executed only every two clocks. FIG. 4A shows an instruction sequence of an inner product calculation and FIG. 4B shows execution timing of this instruction sequence. In this timing chart, F, D, E1, E2 and WB show respective stages of a pipeline, namely, an F/instruction fetch stage, a D/instruction decode stage, E1, E2/ arithmetic executing stages, and a WB/write back stage.

In a second constructional method of the conventional floating point multiply-add calculation unit, independent multiplier and adder-subtracter are mounted and a multiply-accumulation operation is realized by longitudinally connecting these arithmetic units to each other, or bypassing calculation results as an operand. There are a method for providing a dedicated multiply-add instruction and a method for realizing the multiply-accumulation operation by multiplying and adding calculations using bypass. FIG. 5. shows a block diagram of a mantissa arithmetic unit of the second conventional floating point multiply-add calculation unit. The multiplier is constructed by multiplication trees 501, 502 for calculating a product of first and second operands, an adder 505 for finally adding partial products to each other, a normalizing circuit 507 and a leading zero anticipation circuit 506. The adder-subtracter is constructed by a shifter 503 for aligning digits of the operands with each other, an adder 505a for calculating a sum, a normalizing circuit 507a and a leading zero anticipation circuit 506a.

In such a construction, much time is required in comparison with the first constructing method until results of the multiply-accumulation operation are obtained. The floating point arithmetic unit mounted to a general MPU is designed such that 2 to 5 cycles are required to make multiplying, adding and subtracting calculations. For example, assuming that both the multiplying calculation and the adding and subtracting calculations can be executed by two clocks, an instruction can be issued every two cycles, but four clocks are required to obtain the results of a multiply-add. FIG. 6A shows an instruction sequence of an inner product calculation and FIG. 6B shows execution timing of this instruction sequence.

A multiply-accumulation operation having a dependent relation is required to execute the inner product. As explained in FIGS. 4A and 4B or FIGS. 6A and 6B, no multiply-accumulation operation having the dependent relation can be continuously executed when the instruction sequence for calculating the inner product is executed by using the first or second construction.

In such a case, as generally shown by FIGS. 7A and 7B, an independent instruction is executed by a scheduling technique of instructions and an arithmetic latency is hidden. However, when there is no independently executable instruction, the arithmetic unit must wait for termination of calculation results. In particular, when the latency is large as in the second conventional construction, this tendency is increased.

When no multiply-accumulation operation having a dependent relation can be continuously executed, the following problems are caused.

(1) No overhead can be hidden when there is no executable calculation between continuous multiply-accumulation operations having a dependent relation.

(2) A technique such as scheduling, etc. is required and programming is difficult.

(3) Many registers are required since intermediate values are stored.

As mentioned above, different from an integer multiply-add calculation unit, the conventional floating point multiply-add calculation units have much latencies and no multiply-accumulation operation having a dependent relation can be executed every clock.

SUMMARY OF THE INVENTION

In consideration of these problem points, an object of the present invention is to realize three items of (1) data are efficiently transferred between a memory unit of graphic data and a graphic translate engine, (2) an inner product calculation caused by a matrix calculation for performing a perspective transformation and a divisional calculation by 'depth' are efficiently executed, and (3) clamping processing of red (R), green (G) and blue (B) brightnesses in light irradiating processing is executed at high speed.

Another object of the present invention is to provide a floating point multiply-add calculation unit capable of shortening a processing time of a continuous multiply-accumulation operation and particularly starting execution of a dependent multiply-accumulation operation and terminating the dependent multiply-accumulation operation every clock.

To achieve the above objects, there is provided a graphic translate engine for performing a predetermined geometrical arithmetic processing with respect to vertex data of a figure stored to an external memory unit and represented by homogeneous coordinates, the graphic translate engine comprising: an internal memory section divided into plural memory blocks and capable of inputting and outputting data every memory block, and inputting predetermined vertex data from the external memory unit to each memory blocks and holding these vertex data, and outputting the vertex data by switching a connection destination to a data holding section; the data holding section for temporarily storing one portion of the vertex data stored to each memory block of the internal memory section; and an arithmetic section for inputting the vertex data stored to this data holding section and generating graphic data by performing predetermined processing of the vertex data; wherein each memory block of the internal memory section inputs the graphic data generated in the arithmetic section and outputting the graphic data by switching the connection destination to the external memory unit.

In the construction of the above invention, the internal memory section is divided into plural memory blocks able to be independently accessed. Some of these memory blocks are connected to the external memory unit so that graphic data are transferred at high speed. Some of the memory blocks unconnected to the external memory unit are connected to the data holding section and the arithmetic section so that required processing with respect to the graphic data stored to the memory blocks is performed. When the required processing and the data transfer are terminated, the memory blocks connected to the data holding section and the arithmetic section among the plural memory blocks are next connected to the external memory unit and transfer the graphic data at high speed. In contrast to this, the memory blocks connected to the external memory unit and transforming the graphic data at high speed by a data transfer device are connected to the data holding section and the arithmetic section, and performs required processing with respect to the graphic data stored to the memory blocks. Thus, the memory blocks are exclusively connected to the external memory unit, or the data holding section and the arithmetic section and can execute transfer of a large amount of data and arithmetic processing in parallel with each other at high speed.

To achieve the above objects, there is also provided a graphic translate engine comprising: multiply-add calculation units for making a multiply-accumulation operation of x, y and z corresponding to x, y and z of at least a homogeneous coordinate system; at least one divider; first, second and third register files for storing vertex data of a figure corresponding to x, y and z of at least the homogeneous coordinate system; a first bus network for connecting the multiply-add calculation units, the divider and the register files to each other, and supplying first operand data to the multiply-add calculation units and the divider; a second bus network for connecting the multiply-add calculation units, the divider and the register files to each other, and supplying second operand data to the multiply-add calculation units and the divider; and a third bus network for connecting the multiply-add calculation units, the divider and the register files to each other, and writing back calculation results of the multiply-add calculation units and the divider to the register files; wherein each of first reading ports of the first, second and third register files is connected to corresponding input terminals of the first operand of the first, second and third multiply-add calculation units and the divider by the first bus network; each of second reading ports of the first, second and third register files is connected to an input terminal of the second operand of each of the first, second and third multiply-add calculation units and an input terminal of the second operand of the divider by the second bus network including a crossbar switch; the input terminals of the second operand of each of the first, second and third multiply-add calculation units and the divider and the respective second reading ports of the first, second and third register files can be connected to each other in a mutual connection for providing one-to-one correspondence of the registers and the arithmetic units exclusively combined with each other and a one-to-multiple mutual connection for connecting a specific register to plural arithmetic units; output terminals of the first, second and third multiply-add calculation units and the divider are connected to respective writing ports of the first, second and third register files; and at least one of the output terminals of the first, second and third multiply-add calculation units and the output terminal of the divider can be exclusively connected to any writing port of the first, second and third register files, and a writing operation to a predetermined address of the registers can be performed.

In the construction of the above invention, graphic vertex data are inputted to the corresponding first, second and third arithmetic units from the first, second and third register files by using the first and second bus networks so that a required calculation is made. The graphic vertex data are written back to the corresponding first, second and third register files by using the third bus network. Thus, an inner product calculation caused by a matrix calculation for performing a perspective transformation and a divisional calculation by 'depth' can be efficiently executed.

In a preferred embodiment of the present invention, the graphic translate engine further comprises: a first bypass network for directly connecting the output terminals of the first, second and third multiply-add calculation units and the divider to the input terminals of the first operand of the first, second and third multiply-add calculation units and the divider, and directly supplying output results of the first, second and third multiply-add calculation units and the divider to the input terminals of the second operand of the first, second and third multiply-add calculation units and the divider as operands of the first, second and third multiply-add calculation units and the divider before calculation results are written back to the register files, or in parallel with writing back processing; and a second bypass network for directly connecting the output terminals of the first, second and third multiply-add calculation units and the divider to the first and second bus networks, and directly supplying output results of the first, second and third multiply-add calculation units and the divider to the input terminals of the first or second operand of the first, second and third multiply-add calculation units as operands of the first, second and third multiply-add calculation units and the divider in parallel with processing for writing back calculation results.

To achieve the above objects, there is also provided a graphic translate engine comprising: multiply-add calculation units for making a multiply-accumulation operation of x, y, z and w corresponding to x, y, z and w of at least a homogeneous coordinate system; at least one divider; first, second, third and fourth register files for storing vertex data of a figure corresponding to x, y, z and w of at least the homogeneous coordinate system; a first bus network for connecting the multiply-add calculation units, the divider and the register files to each other, and supplying first operand data to the multiply-add calculation units and the divider; a second bus network for connecting the multiply-add calculation units, the divider and the register files to each other, and supplying second operand data to the multiply-add calculation units and the divider; and a third bus network for connecting the multiply-add calculation units, the divider and the register files to each other, and writing back calculation results of the multiply-add calculation units and the divider to the register files; wherein each of first reading ports of the first, second, third and fourth register files is connected to corresponding input terminals of the first operand of the first, second, third and fourth multiply-add calculation units and the divider by the first bus network; each of second reading ports of the first, second, third and fourth register files is connected to an input terminal of the second operand of each of the first, second, third and fourth multiply-add calculation units and an input terminal of the second operand of the divider by the second bus network including a crossbar switch; the input terminals of the second operand of each of the first, second, third and fourth multiply-add calculation units and the divider and the respective second reading ports of the first, second, third and fourth register files can be connected to each other in a mutual connection for providing one-to-one correspondence of the registers and the arithmetic units exclusively combined with each other and a one-to-multiple mutual connection for connecting a specific register to plural arithmetic units; output terminals of the first, second, third and fourth multiply-add calculation units and the divider are connected to respective writing ports of the first, second, third and fourth register files; and at least one of the output terminals of the first, second, third and fourth multiply-add calculation units and the output terminal of the divider can be exclusively connected to any writing port of the first, second, third and fourth register files, and a writing operation to a predetermined address of the registers can be performed.

In a preferred embodiment of the present invention, the graphic translate engine further comprises: a first bypass network for directly connecting the output terminals of the first, second, third and fourth multiply-add calculation units and the divider to the input terminals of the first operand of the first, second, third and fourth multiply-add calculation units and the divider, and directly supplying output results of the first, second and third multiply-add calculation units and the divider to the input terminals of the second operand of the first, second, third and fourth multiply-add calculation units and the divider as operands of the first, second, third and fourth multiply-add calculation units and the divider before calculation results are written back to the register files, or in parallel with writing back processing; and a second bypass network for directly connecting the output terminals of the first, second, third and fourth multiply-add calculation units and the divider to the first and second bus networks, and directly supplying output results of the first, second and third multiply-add calculation units and the divider to the input terminals of the first or second operand of the first, second, third and fourth multiply-add calculation units as operands of the first, second, third and fourth multiply-add calculation units and the divider in parallel with processing for writing back calculation results.

To achieve the above objects, there is further provided a floating point arithmetic unit comprising: sign part judging means for inputting a sign part of a normalized floating point number represented by three fields of the sign part, an exponent part and a mantissa, and judging on the basis of a value of this sign part whether the floating point number is positive or negative; and constant generating means for outputting the floating point number showing '0' when the floating point number is negative as a judging result of this sign part judging means.

In a preferred embodiment of the present invention, the floating point arithmetic unit further comprises exponent part judging means for inputting the exponent part of the normalized floating point number represented by the three fields of the sign part, the exponent part and the mantissa, and judging whether or not a value of this exponent part is equal to or greater than a first predetermined constant; and the constant generating means outputs the floating point number showing a second predetermined constant when it is judged as a judging result of the exponent part judging means that the value of the exponent part is equal to or greater than the first predetermined constant and the floating point number is positive as the judging result of the sign part judging means.

Accordingly, clamping processing of R, G and B brightnesses in light irradiating processing can be executed at high speed.

In a preferred embodiment of the present invention, the first predetermined constant and the second predetermined constant is 1.

To achieve the above objects, there is provided a graphic translate engine for performing a predetermined geometrical arithmetic processing with respect to vertex data of a figure stored to an external memory unit and represented by homogeneous coordinates, the graphic translate engine comprising the above floating point arithmetic unit.

To achieve the above objects, there is provided a floating point multiply-add calculation unit for inputting first, second and third operands and calculating a multiply-add of these operands, the floating point multiply-add calculation unit comprising: multiplying means for calculating a product of the first and second operands; digit-aligning means for inputting a shifting mount as information for a digit alignment and digit-aligning the third operand or a first preceding calculation result and a multiplying result calculated by the multiplying means; adding means for calculating a sum of the multiplying result and a digit-aligning result of the digit-aligning means; normalizing means for normalizing a mantissa of a multiply-add calculation result of the adding means; exponent part arithmetic means for calculating an exponent of the product of the first and second operands; shifting amount calculating means for calculating the shifting amount of the third operand or a second preceding calculation result and outputting the shifting amount to the digit-aligning means; and exponent part normalizing arithmetic means for normalizing an exponent part of the multiply-add calculation result; wherein when a second multiply-accumulation operation is continuously executed after a first multiply-accumulation operation, at the executing time of the second multiply-accumulation operation, the digit-aligning means inputs the multiply-add calculation result of the first multiply-accumulation operation made by the adding means as the first preceding calculation result, and the digit-aligning means performs digit-aligning processing with the product of the first and second operands of the second multiply-accumulation operation; and the shifting amount calculating means calculates the difference between an exponent of the product of the first and second operands in the second multiply-accumulation operation and the value of an exponent part of the first multiply-accumulation operation, and sets the difference to a shifting amount.

In a preferred embodiment of the present invention, the adding means transmits a calculation intermediate value of the first multiply-accumulation operation to the digit-aligning means as an operand of the second multiply-accumulation operation prior to completion of the first multiply-accumulation operation so that the second multiply-accumulation operation is started without waiting for termination of the first multiply-accumulation operation; and the digit-aligning means receives the intermediate value of the first multiply-accumulation operation as the operand of the second multiply-accumulation operation after the second multiply-accumulation operation is started.

In the construction of the above invention, when a multiply-accumulation operation is continuously executed, the result of a preceding multiply-accumulation operation is fed back as a third operand of the multiply-accumulation operation executed at present without normalizing this result, and a digit alignment is executed. The digit alignment is performed as the difference between an exponent part of the product of the first and second operands in the multiply-accumulation operation executed at present and an exponent part (unnormalized) in the preceding multiply-accumulation operation.

Accordingly, in accordance with the above construction of the present invention, it is possible to shorten a processing time of the continuous multiply-accumulation operation and particularly start execution of a dependent multiply-accumulation operation and terminate the dependent multiply-accumulation operation every clock.

There is also provided a graphic translate engine for performing a predetermined geometrical arithmetic processing with respect to vertex data of a figure stored to an external memory unit and represented by homogeneous coordinates, the graphic translate engine comprising the above floating point multiply-add calculation unit.

The nature, principle and utility of the invention will become more apparent from the following detailed description when read in conjunction with the accompanying drawings.

BRIEF DESCRIPTION OF THE DRAWINGS

In the accompanying drawings:

FIGS. 4A and 4B are views for explaining an example of an inner product calculation by the first conventional floating point multiply-add calculation unit;

FIGS. 6A and 6B are views for explaining an example of an inner product calculation by the second conventional floating point multiply-add calculation unit;

FIGS. 7A and 7B are views for explaining a case in which an instruction is independently executed by an instructional scheduling technique in a conventional example;

FIGS. 17A and 17B are views for explaining an example of an inner product calculation in this embodiment.

DESCRIPTION OF THE PREFERRED EMBODIMENTS

Figure 1:
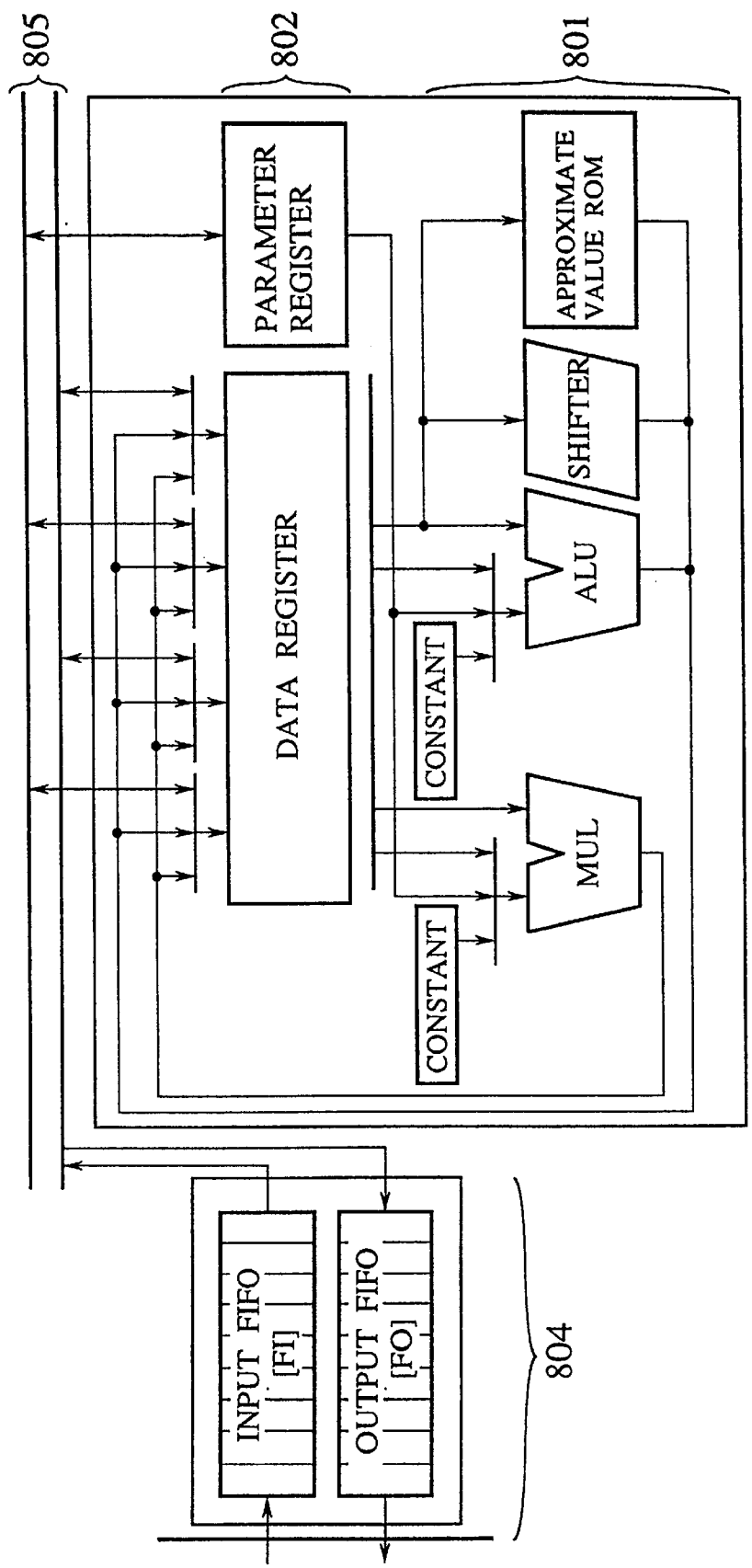
FIG. 1 is a view showing an example of a conventional graphic translate engine.
Figure 2:
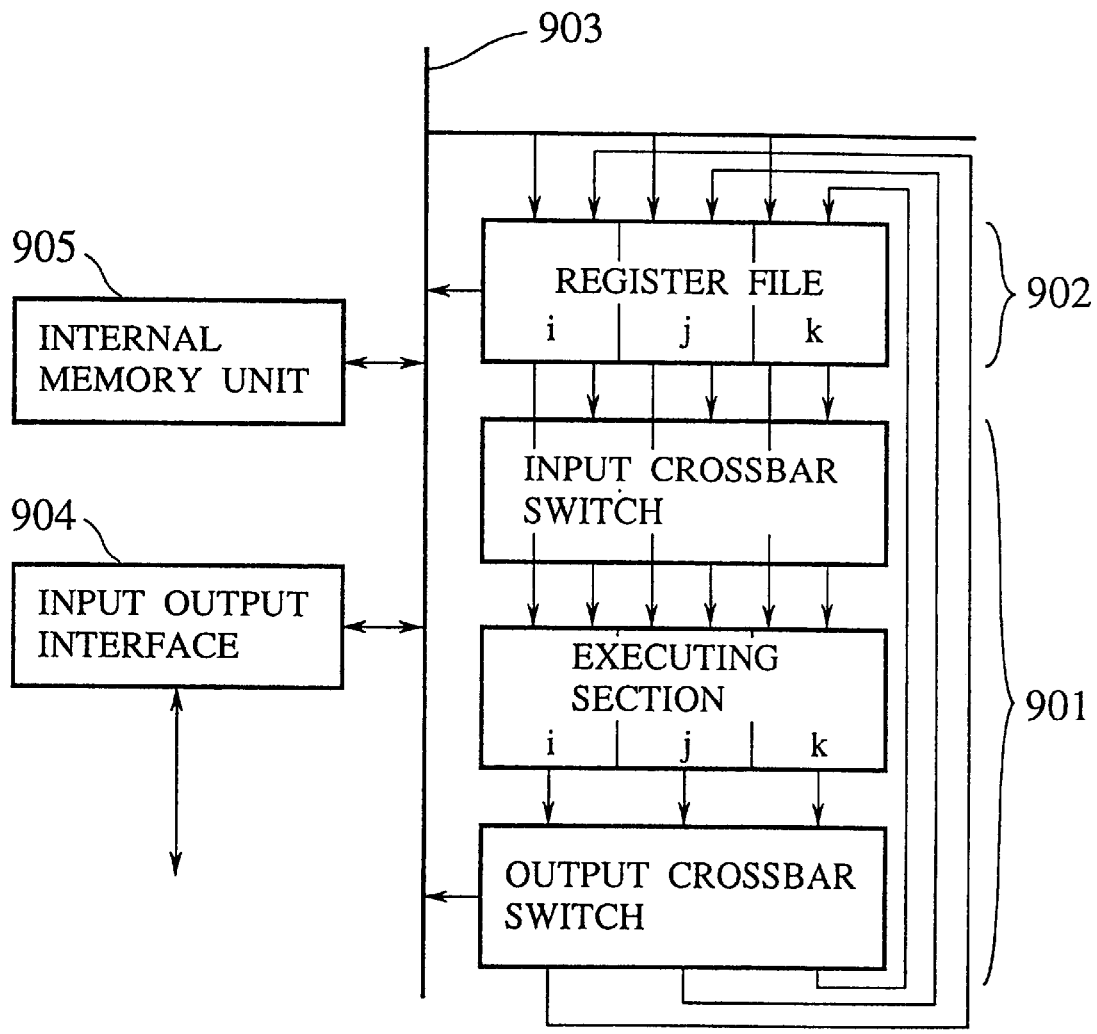
FIG. 2 is a view showing an example of another conventional graphic translate engine.
Figure 3:
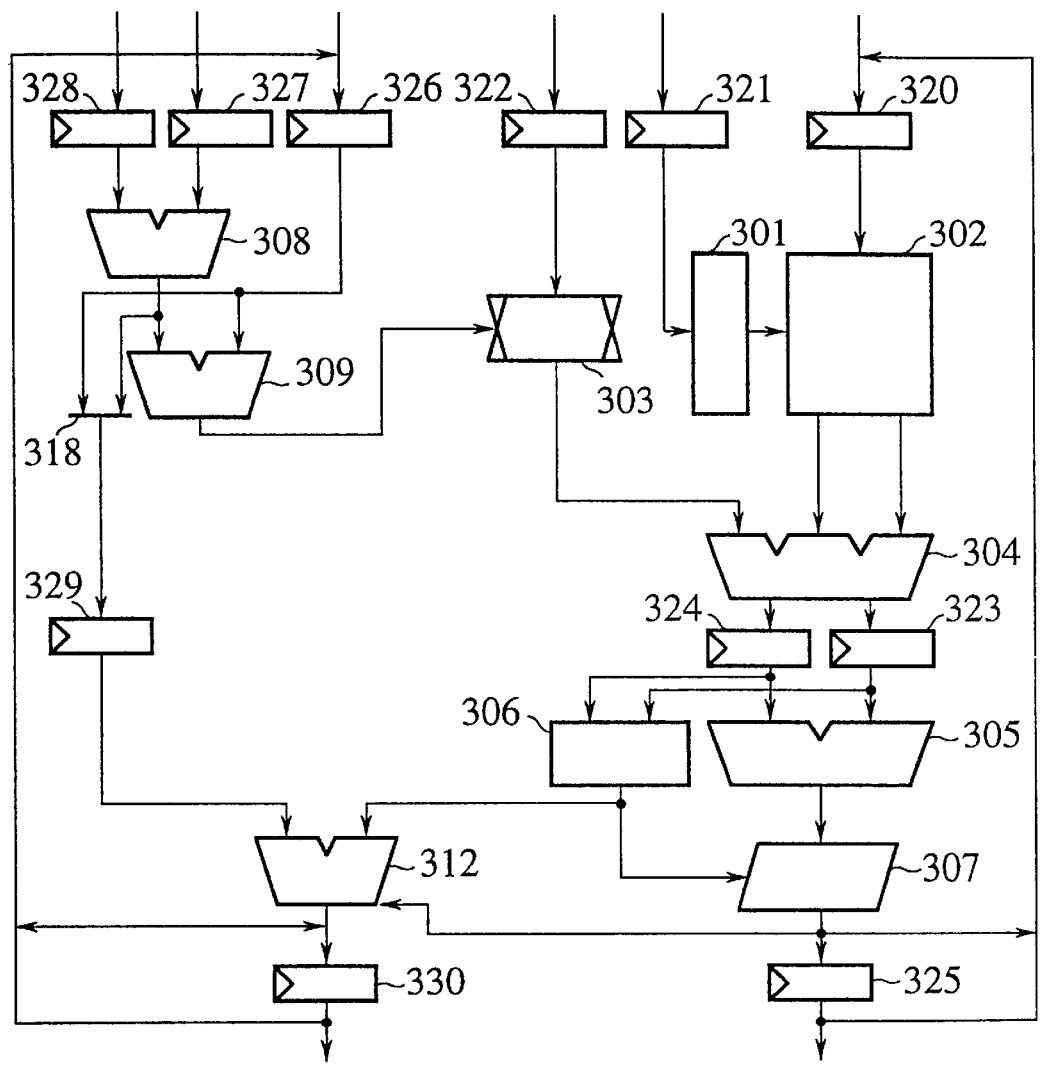
FIG. 3 is a block diagram showing an example of a first conventional floating point multiply-add calculation unit.
Figure 5:
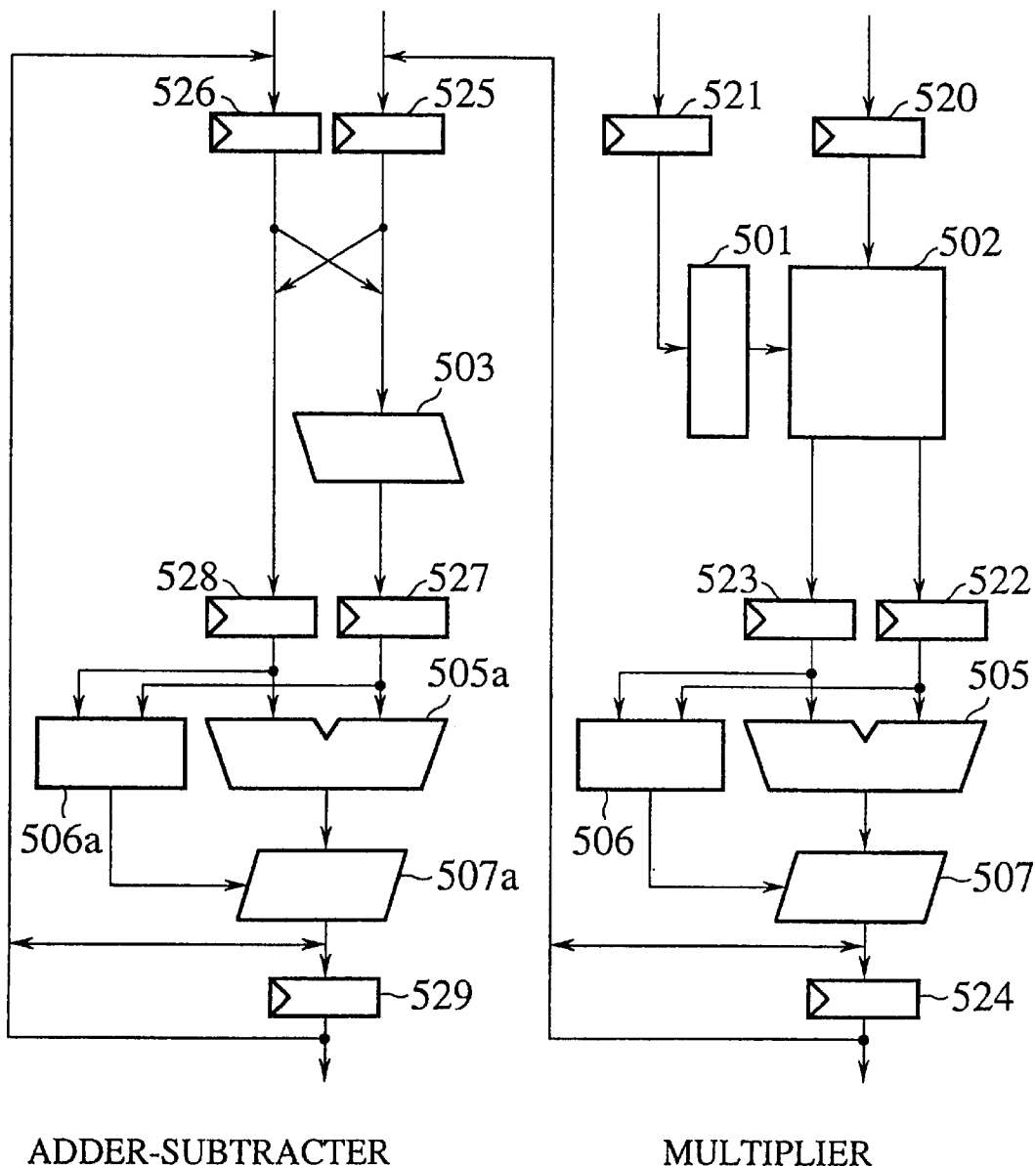
FIG. 5 is a block diagram showing an example of a second conventional floating point multiply-add calculation unit.
Figure 8:
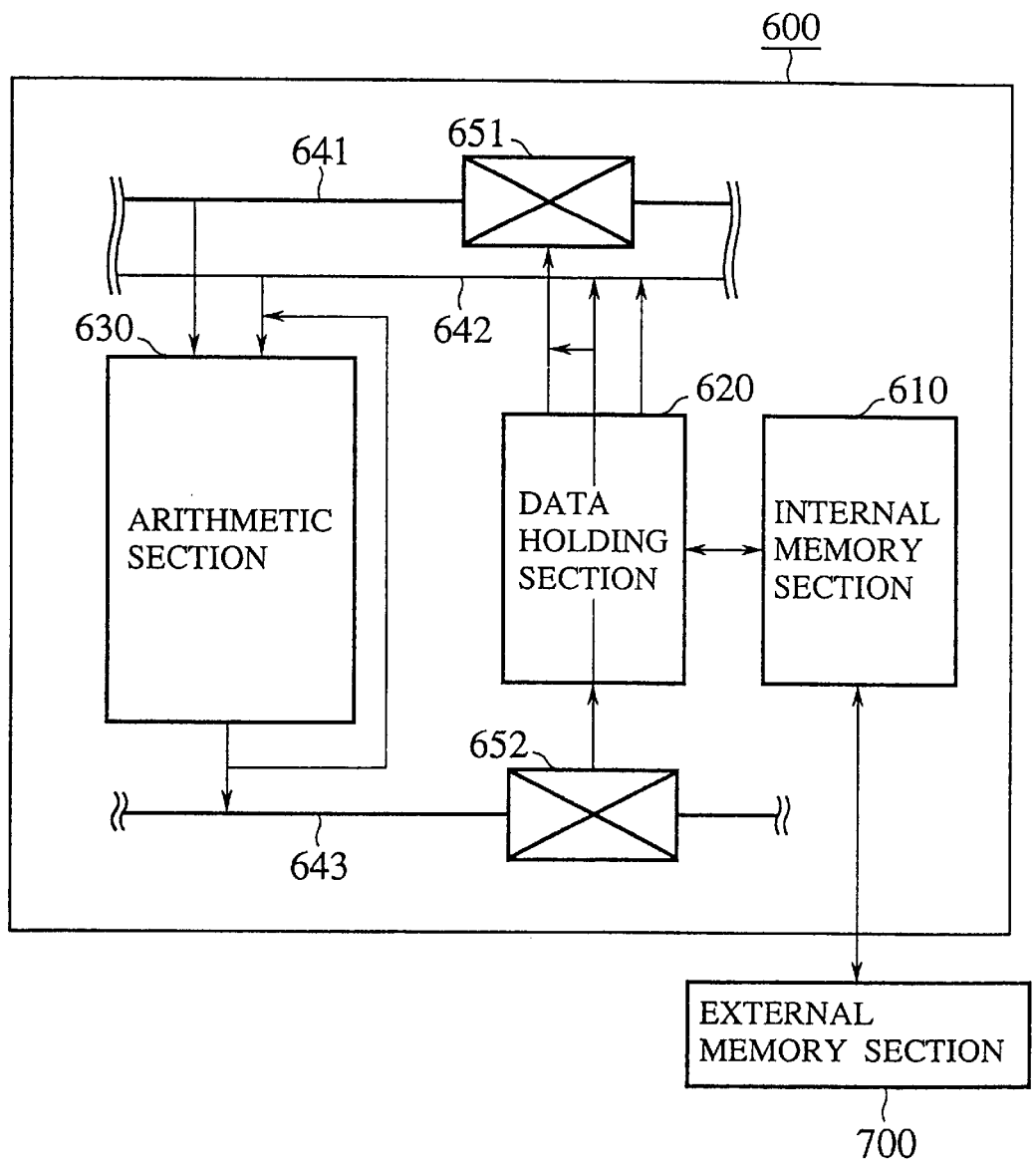
FIG. 8 is a block diagram of a graphic translate engine according to the present invention.

FIG. 8 is a block diagram showing the construction of a graphic translate engine (GTE) of the present invention. The construction of an embodiment of a proposed arithmetic system will first be explained with reference to FIG. 8. This graphic translate engine 600 has an internal memory section 610, a data holding section 620 and an arithmetic section 630. The internal memory section 610 inputs predetermined vertex data from an external memory unit 700 to a memory block and holds the predetermined vertex data. The internal memory section 610 switches a connection destination to the data holding section 620 and outputs the vertex data. The data holding section 620 temporarily stores one portion of the vertex data stored to the predetermined memory block of the internal memory section 610. The vertex data stored to the data holding section 620 are inputted to the arithmetic section 630 and this arithmetic section 630 performs predetermined processing of the vertex data and generates graphic data. The memory block of the internal memory section 610 is constructed such that the graphic data generated by the arithmetic section 630 are inputted to this memory block through the data holding section 620 and a connection destination is switched to the external memory unit 700 and the graphic data are outputted to this external memory unit 700.

Figure 9:
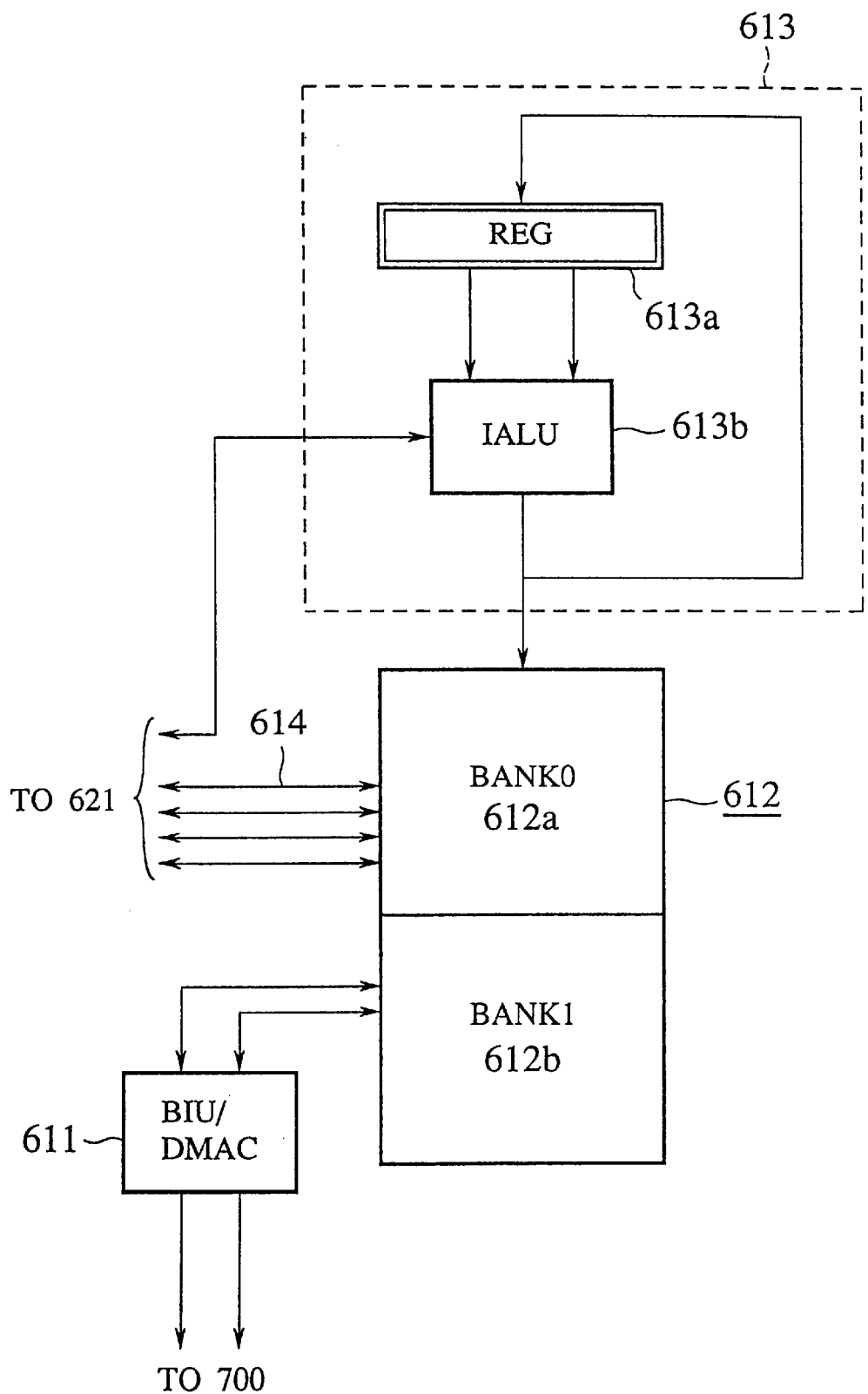
FIG. 9 is a block diagram showing an internal memory section.

FIG. 9 shows the construction of the internal memory section 610. The internal memory section 610 is connected to the external memory unit 700 through a DMA controller 611 (described later). An internal memory unit 612 is a memory unit of 2M bytes constructed by two banks 612a and 612b (each of these banks is constructed by 1M byte). These banks are connected to the arithmetic section and a register file through a load store unit 621. Otherwise, These banks are connected to the external memory unit 700 through the DMA controller 611. These connections are exclusively formed so that only one of these connections is formed. An address generator 613 generates an address for getting access to the internal memory unit 612.

Figure 10:
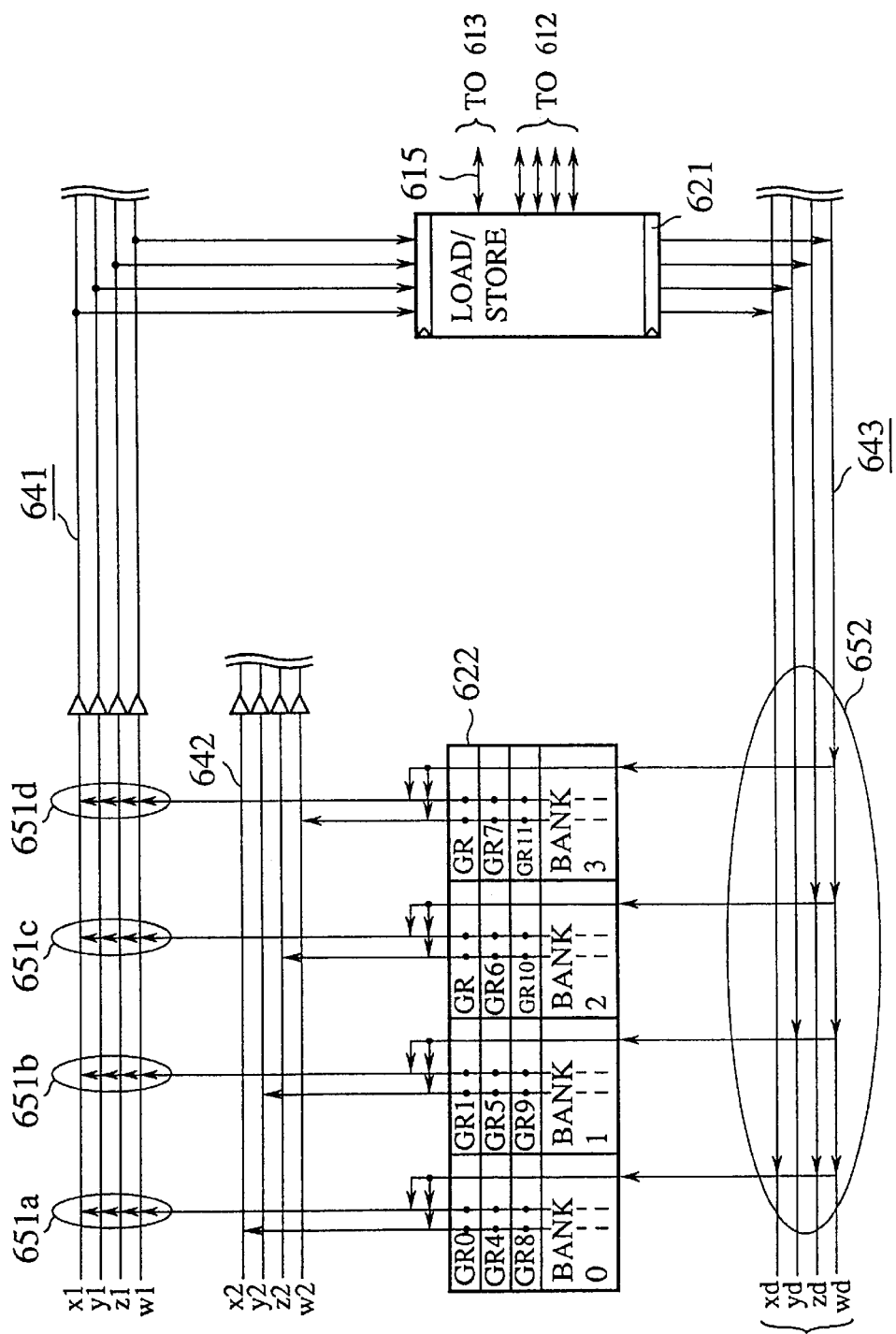
FIG. 10 is a block diagram showing a data holding section.

FIG. 10 shows the construction of the data holding section 620. The load store unit 621 connects the internal memory unit 612 and a register file 622 to each other through a high band width bus 641 of 128 bits (32 bits×4) so as to mutually transfer data. The register file 622 is a register file of 32 bits×64 divided into four banks composed of bank 0 to bank 3. A register of register number n (64>n≧0) belongs to a bank of bank number (n mod 4). Here, a mod b shows the remainder of a value obtained by dividing a by b. Here, the respective banks correspond to (x, y, z, w) of a homogeneous coordinate system. Namely, banks 0, 1, 2 and 3 respectively correspond to x, y, z and w.

Figure 11:
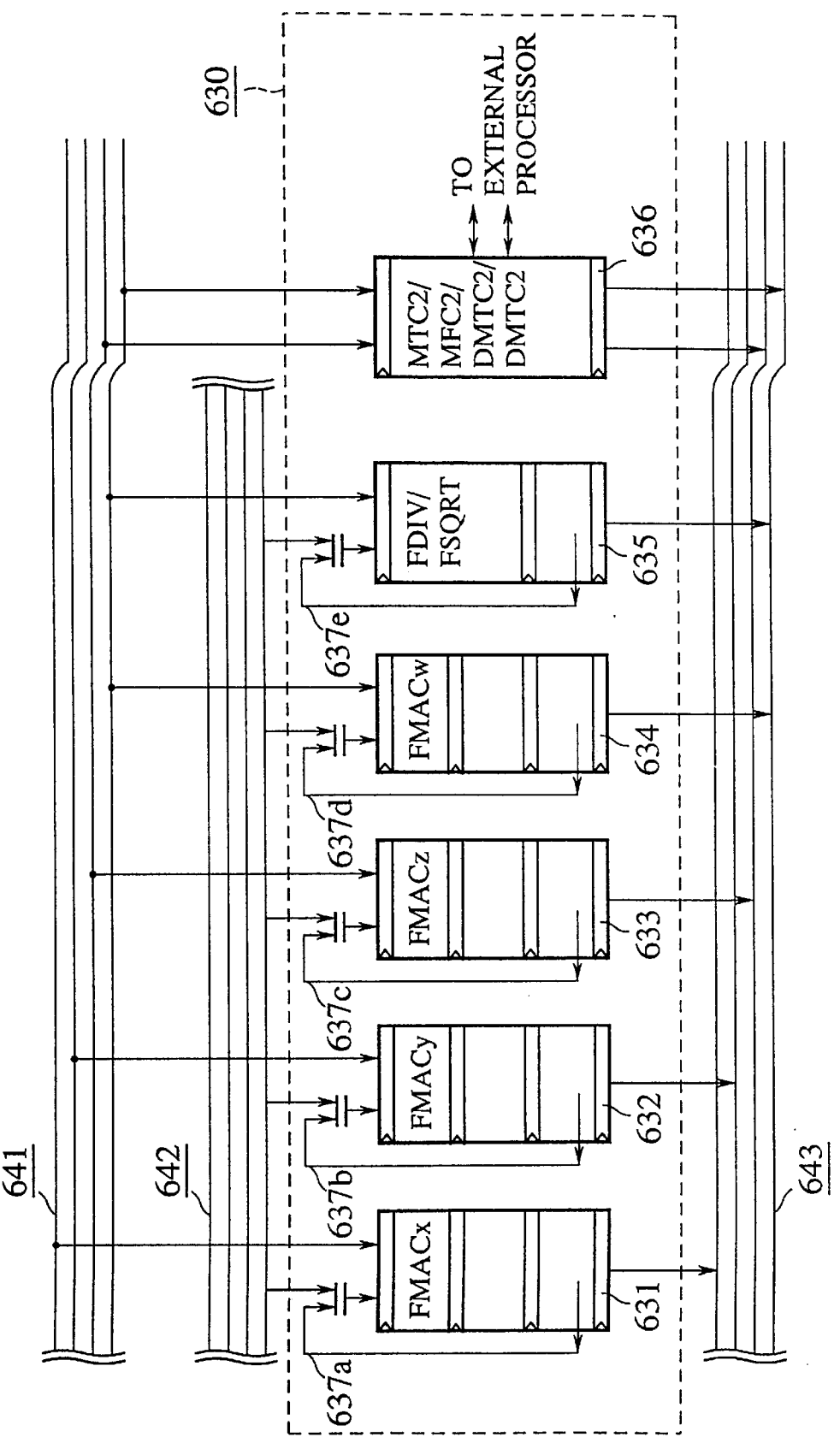
FIG. 11 is a block diagram showing an arithmetic section.

FIG. 11 shows the construction of the arithmetic section 630. Reference numerals 631 to 634 designate multiply-add calculation units constructed by a pipeline at three stages. Similar to the registers, the multiply-add calculation units correspond to (x, y, z, w) of the homogeneous coordinate system. Namely, the arithmetic units 631, 632, 633 and 634 respectively correspond to x, y, z and w. An arithmetic unit 635 makes a divisional calculation and a square root calculation. These calculations are terminated in six cycles. An input output port 636 transfers data between this port and an external processor and is connected to a bus of 64 bits.

A bus 641 constitutes a bus network for mutually connecting the register file 622, the arithmetic unit 630, the load store unit 621. This bus 641 has a width of 32 bits×4 (128 bits) and connects the arithmetic unit 630 and the register file 622 corresponding to (x, y, z, w) of the homogeneous coordinate system through a crossbar switch 651. The crossbar switch 651 can connect the register file 622, the arithmetic section 630 and the load store unit 621 in any combination if the combination is exclusive.

A bus 642 constitutes a bus network for mutually connecting the register file 622 and the arithmetic unit (except for the port 636) 630. This bus 642 has a width of 32 bits×4 (128 bits) and connects the arithmetic unit 630 and the register file 622 corresponding to (x, y, z, w) of the homogeneous coordinate system such that the arithmetic unit 630 and the register file 622 correspond to each other.

A bus 643 constitutes a bus network for mutually connecting the register file 622, the arithmetic section 630 and the load store unit 621. This bus 643 has a width of 32 bits×4 (128 bits) and connects the register file 622 corresponding to (x, y, z, w) of the homogeneous coordinate system, the arithmetic section 630 and the load store unit 621 through a crossbar switch 652. The crossbar switch 652 can exclusively connect the register file 622, the arithmetic section 630 and the load store unit 621. Calculation results of the arithmetic units 631, 632 and 633 can be written back to only the corresponding register file 622. In contrast to this, values of the arithmetic units 634, 635, the port 636 and the load store unit 621 can be also written to any address of the register file.

This embodiment has the above construction. Data transfer and an operation of coordinate transformation processing in this embodiment will next be explained.

The data transfer between the external memory unit 700 and the graphic translate engine 600 will first be explained. Graphic vertex coordinate data, color information, texture information, etc. are stored to the external memory unit 700. The external memory unit 700 is used as a general purpose memory unit of a processor. In the internal memory unit 610, one bank 612b is connected to the external memory unit 700 through the DMA controller 611. Required graphic data are transferred to the bank 612b of the internal memory unit 610 at high speed under control of the DMA controller 611. In the meantime, the bank 612a is connected to buses 641 and 643 through the load store unit 621 and is connected to the internal arithmetic section 630 and the register file 622.

When the transfer of data required for the bank 612b is terminated, the bank 612b is connected to the buses 641 and 643 through the load store unit 621 and is connected to the arithmetic section 630 and the register file 622. The required data are transferred to the register file 622 from the bank 612b and predetermined processing of the required data is performed by the arithmetic unit 630. Processed results are written back to the bank 612b through the register file 622. In contrast to this, the bank 612a is conversely connected to the external memory unit 700 through the DMA controller 611 and required graphic data are transferred to the bank 612a of the internal memory unit 610 at high speed under control of the DMA controller 611.

When the processing with respect to data of the bank 612b and the data transfer to the bank 612a are terminated, the bank 612b is again connected to the external memory unit 700. Thus, processed results are written back to the external memory unit 700 under control of the DMA controller 611 and graphic data to be next processed are transferred. In contrast to this, the bank 612a is connected to the buses 641 and 643 through the load store unit 621 and is connected to the arithmetic section 630 and the register file 622. The required data are transferred to the register file 622 from the bank 612b and predetermined processing of the required data is performed by the arithmetic section 630. Processed results are written back to the bank 612a through the register file 622.

Thus, two processings can be executed in parallel with each other at high speed by alternately allocating the two banks to the data transfer and the arithmetic processing as mentioned above. Since complicated control and a special memory unit are not required, an internal memory unit having a sufficient amount can be mounted at low cost.

An example of a perspective transformation performed in this embodiment will next be shown. Assuming that an input (x, y, z, w) is vertex coordinates to be transformed, the perspective transformation is performed on the basis of the following formulas (15) to (17). Thus, X and Y coordinates on the screen are outputted after the (X, Y) perspective transformation.

$$(x', y', w') = (x, y, z, 1) \times \begin{pmatrix} a, b, c \\ d, e, f \\ g, h, i \\ j, k, l \end{pmatrix} \quad (15)$$

$$= (ax + dy + gz + j, bx + ey + hz + k, cx + fy + iz + 1)$$

$$W = 1/w' \quad (16)$$

$$(X, Y) = (x', y') \times W \quad (17)$$

An example of a program in which the above processing is applied to an independent triangle (vertex number 3) will next be shown.

Since three-dimensional graphic data are normally treated as a set of independent triangles, the following program is repeatedly processed. Here, a matrix is set to a product matrix of a coordinate transformation and the perspective transformation. Latency of a multiplying calculation and a multiply-accumulation operation is set to 3 and its throughput is set to 1. Latency of a divisional calculation is set to 6 and its throughput is set to 5. Latency of a final instruction is set to be not considered. Input vertex data are loaded from the internal memory unit and coordinate transformation results are transformed to a fixed point and are stored to the internal memory unit.

Symbols and mnemonic codes used in the program will next be described briefly.
Symbol/
R*: CPU register
GR*: GTE floating register
IR: GTE integer register
Mnemonic/
GMACn: multiply-add calculation instruction, write back to accumulator
GMACFn: multiply-add calculation instruction, write back to register file
GMULAn: multiplication instruction, write back to accumulator
GDIV: divisional instruction
GFTOIn: floating point→fixed point transforming instruction
GSWn: storing instruction
GLWn: loading instruction Here, n shows the number of arithmetic units simultaneously operated. For example, GMAC4 shows that data are independently inputted to each of four arithmetic units of the arithmetic section 630 from the register file 622 and calculation results are written back to the corresponding four register files 622.

Respective data are also stored to the register files 622 as follows.
; register map
; GR00, GR01, GR02, GR03, ; vertex 1(x, y, z, 1) coordinates
; GR04, GR05, GR06, GR07, ; vertex 2(x, y, z, 1) coordinates
; GR08, GR09, GR10, GR11, ; vertex 3(x, y, z, 1) coordinates
GR12, GR13, GR14, GR15, ; 640, 480, 0, 1(constant storage space)
; GR16, GR17, GR18, GR19, ; vertex 1 tmp coordinates (x', y', z'), 1/z
; GR20, GR21, GR22, GR23, ; vertex 2 tmp coordinates (x', y', z'), 1/z
; GR24, GR25, GR26, GR27, ; vertex 3 tmp coordinates (x', y', z'), 1/z
; GR28, GR29, GR30, GR31,
; GR32, GR33, GR34, GR35, ; coordinate perspective transformation matrix
; GR36, GR37, GR38, GR39, ; coordinate perspective transformation matrix
GR40, GR41, GR42, GR43, ; coordinate perspective transformation matrix
GR44, GR45, GR46, GR47, ; coordinate perspective transformation matrix
GR48, GR49, GR50, GR51, ; final result (x", y") vertex 1
; GR52, GR53, GR54, GR55, ; final result (x", y") vertex 2
GR56, GR57, GR58, GR59, ; final result (x", y") vertex 3
GR60, GR61, GR62, GR63, ;

A program is shown as follows when no optimum operation is performed.
; vertex 1 ----------------------
  GLW4 GR(00–03), ox00(IR1) ; V1 : vertex 1 coordinate load
  GMULA3 GR(32–34), GR00 ; V1: transformation vertex 1x& ACC clear
  GMAC3 GR(36–38), GRO1 ; V1 : transformation vertex 1 y
  GMAC3 GR(40–42), GR02 ; V1 : transformation vertex 1 z
  GMACF3 GR(16–18), GR(44–46), GR03 ; V1 : parallel displacement element (GR03=1)
  GDIV GR19, GR15, GR18 ; V1 : divisional execution (GR15=1)
  GMUL2 GR(48–49), GR(16–17), GR19 ; V1 : (x', y')×1/z
  GFTOI2 GR(48–49), GR(48–49), FM1 ; V1 : fixed point transformation
  GSW2 GR(48–49), 0×10(IR2) ; V1 : store to GPU preprocessing section
; vertex 2 ----------------------
  GLW4 GR(00–03), ox10(IR1) ; V2 : vertex 1 coordinate load
  GMULA3 GR(32–34), GR04 ; V2 : transformation vertex 2x& ACC clear
  GMAC3 GR(36–38), GR05 ; V2 : transformation vertex 2 y
  GMAC3 GR(40–42), GR06 ; V2 : transformation vertex 2 z
  GMACF3 GR(20–22), GR(44–46), GR07 ; V2 : parallel displacement element (GR07=1)

GDIV GR23, GR15, GR22 ; V2 : divisional execution (GR15=1)
GMUL2 GR(52–53), GR(20–21), GR23 ; V2 : (x', y')33 1/z
GFTOI2 GR(52–53), GR(52–53), FM1 ; V2 : fixed point transformation
GSW2 GR(52–53), 0×10(IR2) ; V2 : store to GPU preprocessing section
; vertex 3 ----------------------
GLW4 GR(00–03), 0×20 (IR1) ; V3 : vertex 1 coordinate load
GMULA3 GR(32–34), GR08 ; V3 : transformation vertex 3×& ACC clear
GMAC3 GR(36–38), GR09 ; V3 : transformation vertex 3 y
GMAC3 GR(40–42), GR10 ; V3 : transformation vertex 3 z
GMACF3 GR(24–26), GR(44–46), GR11 ; V3 : parallel displacement element (GR11=1)
GDIV GR27, GR15, GR26 ; V3 : divisional execution (GR15=1)
GMUL2 GR(56–57), GR(24–25), GR27 ; V3 : (x', y')×1/z
GFTOI2 GR(56–57), GR(56–57), FM1 ; V3 : fixed point transformation
GSW2 GR(56–57), 0×20 (IR2) ; V3 : store to GPU preprocessing section A program is shown below when the optimum operation is performed in consideration of latency and throughput. In this program, load and storage of data and transformation processing to a fixed point are omitted.

Figure 12:
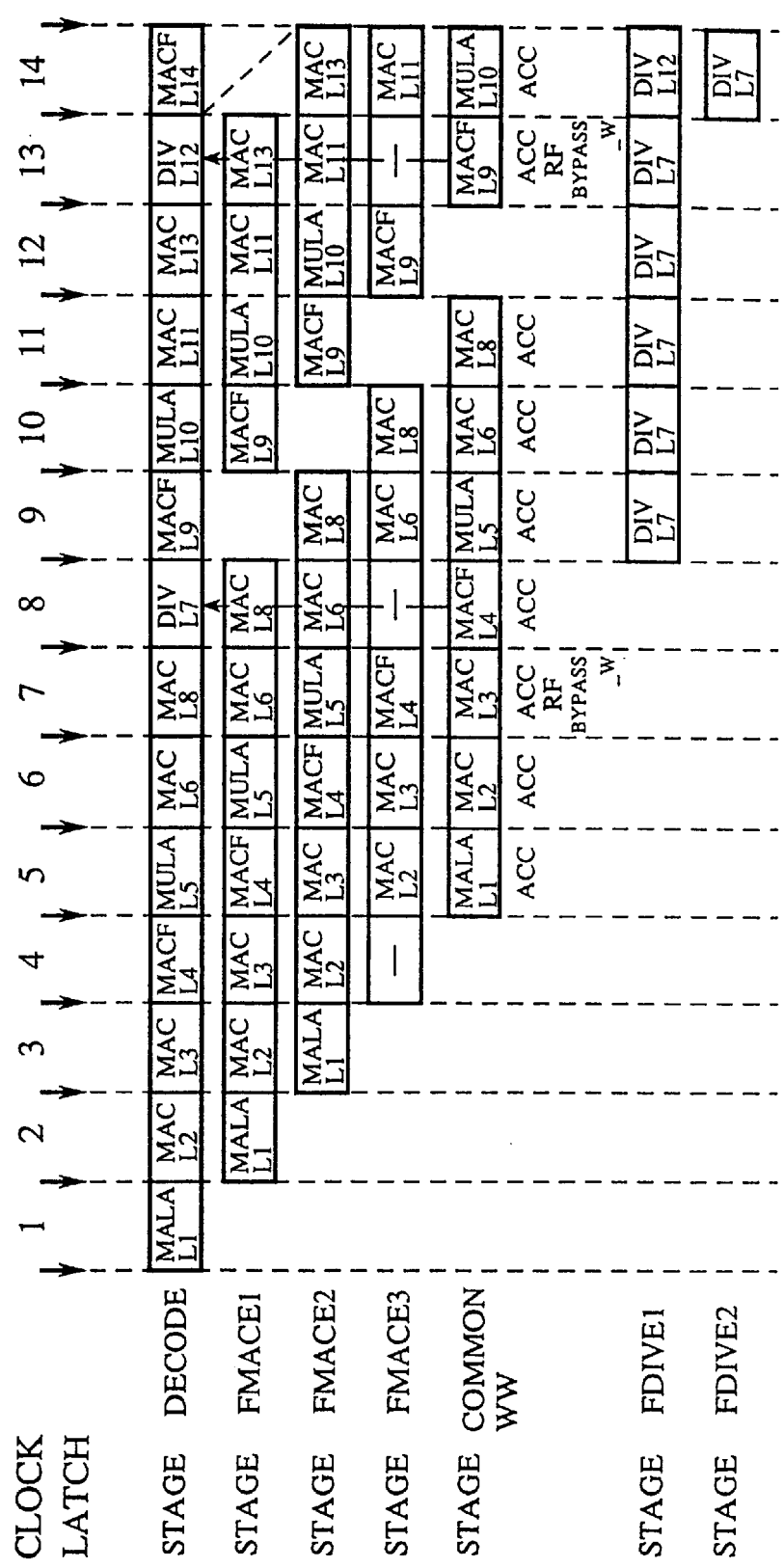
FIG. 12 is an executing timing chart of a coordinate transformation using an arithmetic unit in an embodiment of the present invention.
Figure 13:
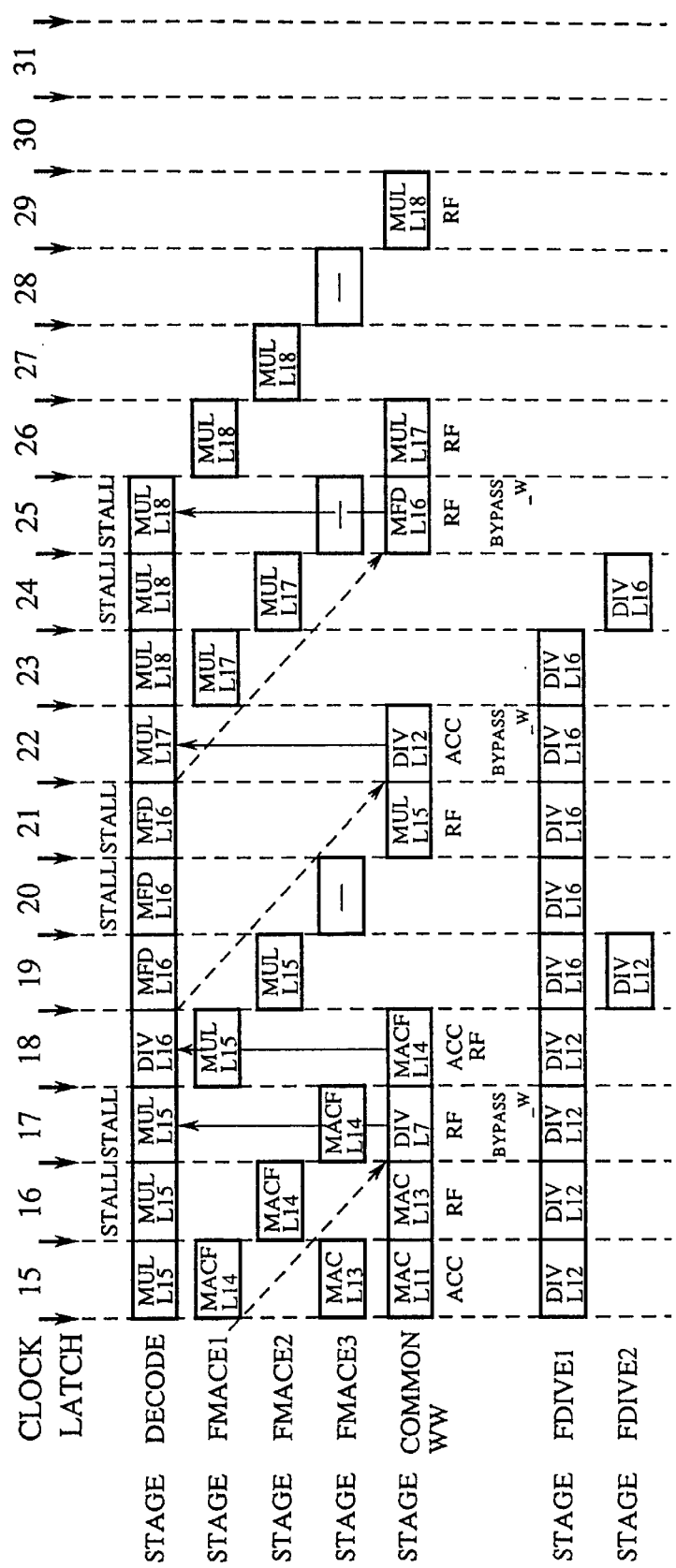
FIG. 13 is another executing timing chart of the coordinate transformation using the arithmetic unit in this embodiment.

GMULA3 GR(32–34), GR00 ; V1 : transformation vertex 1×& ACC clear
GMAC3 GR(36–38), GR01 ; V1 : transformation vertex 1 y
GMAC3 GR(40–42), GR02 ; V1 : transformation vertex 1 z
GMACF3 GR(16–18), GR(44–46), GR03 ; V1 : parallel displacement element (GR03=1)
GMULA3 GR(32–34), GR04 ; V2 : transformation vertex 2×& ACC clear
GMAC3 GR(36–38), GR05 ; V2 : transformation vertex 2 y
GMAC3 GR(40–42), GR06 ; V2 : transformation vertex 2 z
GDIV GR19, GR15, GR18 ; V1 : divisional execution (GR15=1)
GMACF3 GR(20–22), GR(44–46), GR07 ; V2 : parallel displacement element (GR07=1)
GMULA3 GR(32–34), GR08 ; V3 : transformation vertex 3×& ACC clear
GMAC3 GR(36–38), GR09 ; V3 : transformation vertex 3 y
GMAC3 GR(40–42), GR10 ; V3 : transformation vertex 3 z
GDIV GR23, GR15, GR22 ; V2 : divisional execution (GR15=1)
GMACF3 GR(24–26), GR(44–46), GR11 ; V3 parallel displacement element (GR11=1)
-- stall
-- stall
GMUL2 GR(48–49), GR(16–17), GR19 ; V1 : (x', y')×1/z
GDIV GR27, GR15, GR26 ; V3 : divisional execution (GR15=1)
-- stall
-- stall
GMUL2 GR(52–53), GR(20–21), GR23 ; V2 : (x', y')×1/z
-- stall
-- stall
GMUL2 GR(56–57), GR(24–25), GR27 ; V3 (x', y')×1/z FIGS. 12 and 13 show timings of execution of the above program. Thus, the inner product calculation caused by a matrix calculation for performing the coordinate transformation can be efficiently executed by applying the present invention to the GTE. In particular, the divisional calculation and the matrix calculation can be executed in parallel with each other so that no ability of plural arithmetic units is uselessly used.

Namely, the graphic translate engine (GTE) can perform the following contents by using this construction.

(1) Data are efficiently transferred between a memory unit of graphic data and the graphic translate engine.

(2) The inner product calculation caused by the matrix calculation for performing the coordinate transformation is efficiently executed.

Figure 14:
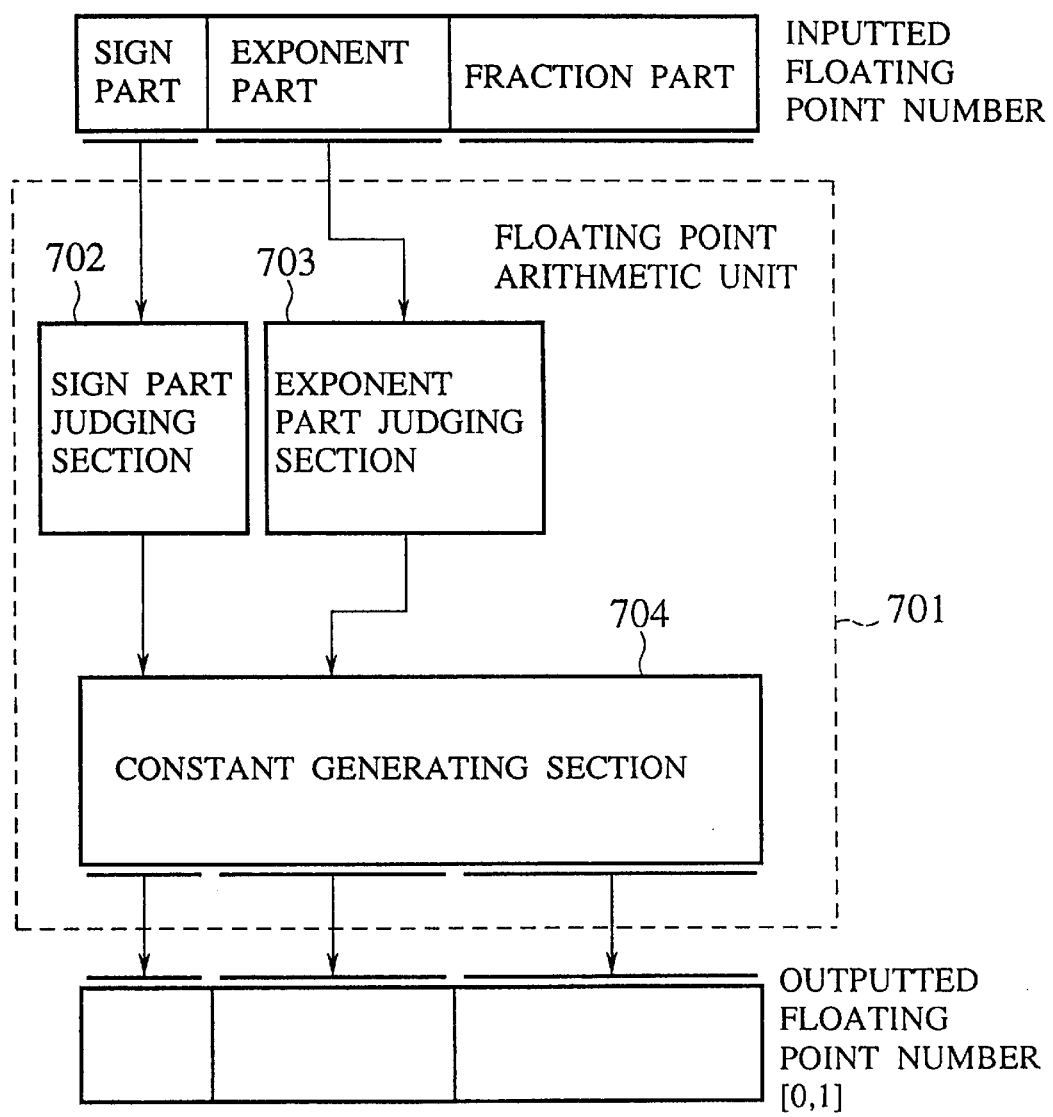
FIG. 14 is a block diagram of a floating point arithmetic unit according to the present invention.

FIG. 14 is a block diagram showing the construction of a floating point arithmetic unit in accordance with one embodiment of the present invention. The construction of an embodiment of a proposed arithmetic system and its operation will next be explained with reference to FIG. 14. A floating point number treated by this floating point arithmetic unit is set to a single precision number (32 bits) determined in an IEEE754 floating point arithmetic standard. For example, the floating point arithmetic unit in the present invention is applied to the arithmetic units 631 to 634 in FIG. 11.

Reference numeral 701 designates a floating point arithmetic unit including a function of the present invention and is one of arithmetic units constituting the graphic translate engine. The floating point arithmetic unit 701 includes a sign part judging section 702, an exponent part judging section 703 and a constant generating section 704. The sign part judging section 702 judges by the value of a sign part of an inputted floating point number whether the input value is positive or negative. In the embodiment, the sign part judging section 702 judges that the input value is negative if the input value is '1', and judges that the input value is positive if the input value is '0'. Accordingly, in the embodiment, no concrete circuit is required and a sign signal can be used as it is. Judging results are inputted to the constant generating section 704.

The exponent part judging section 703 is a comparator for judging by the value of an exponent part whether or not an absolute value of the input value is 'equal to or greater than one'. The inputted floating point number is normalized. Accordingly, if the value of the exponent part is '127' in the embodiment, the absolute value of the input value becomes $$\text{mantissa } (1.\ \text{xxxxx} \text{-----}) \times 2^{127-127} \text{ (fraction part: x is '0') or '1')}.$$

Accordingly, if the value of biased exponent of IEEE754 is a normalized number equal to or greater than '127' ($\geq 127$), it is judged that the inputted floating point number is 'equal to or greater than one'. Accordingly, in the embodiment, it is sufficient to construct the exponent part judging section 703 by a comparing circuit (comparator) for judging a large or small relation between the value of the exponent part and the constant 127. Judging results are inputted to the constant generating section 704.

The constant generating section 704 outputs the floating point number of '0' or '+1' as calculation results by the judging results of the sign part judging section 702 and the exponent part judging section 703. When the judging results of the sign part judging section 702 show 'negative", the constant generating section 704 changes three field values of the sign part, the exponent part and the mantissa so as to provide a floating point number showing '0'. In contrast to this, when the judging results of the sign part judging section 702 show 'positive' and the judging results of the exponent part judging section 703 show that 'the absolute value is equal to or greater than one', the constant generating section 704 changes the three field values of the sign part, the exponent part and the mantissa so as to provide a floating point number showing '+1". The constant generating section 704 then outputs '+1' as calculation results. Accordingly, in this embodiment, the constant generating section 704 can be constructed by a selecting circuit for selecting constant '0' or '1', or the input value (an inputted sign radix point number) by the judging results of the sign part judging section 702 and the exponent part judging section 703.

In the above embodiment, the explanation with respect to the single precision number has been described. In the case of a double precision number, the value of the exponent part in the exponent part judging section is compared with a constant 1023 instead of the above constant 127. The above explanation relates to a floating point number based on the ANSI/IEEE Standard754-1985. However, the above operation can be also realized in a similar processing procedure in the case of a floating point number represented by another format.

As mentioned above, if the floating point arithmetic unit in this embodiment is used, a clamping operation to a specific value ([0, 1] in the embodiment) can be performed by an input value by adding small hardware. Accordingly, clamping processing conventionally performed by using a comparing instruction and a conditional branching instruction can be executed at high speed without causing any disturbance of a pipeline caused by branching. In particular, light irradiating processing can be executed at high speed if the present invention is applied to processing clamping to [0,1] which is frequently used in a brightness calculation, a blend calculation of colors, etc., and unarea processing of the light irradiating processing in computer graphics.

Figure 15:
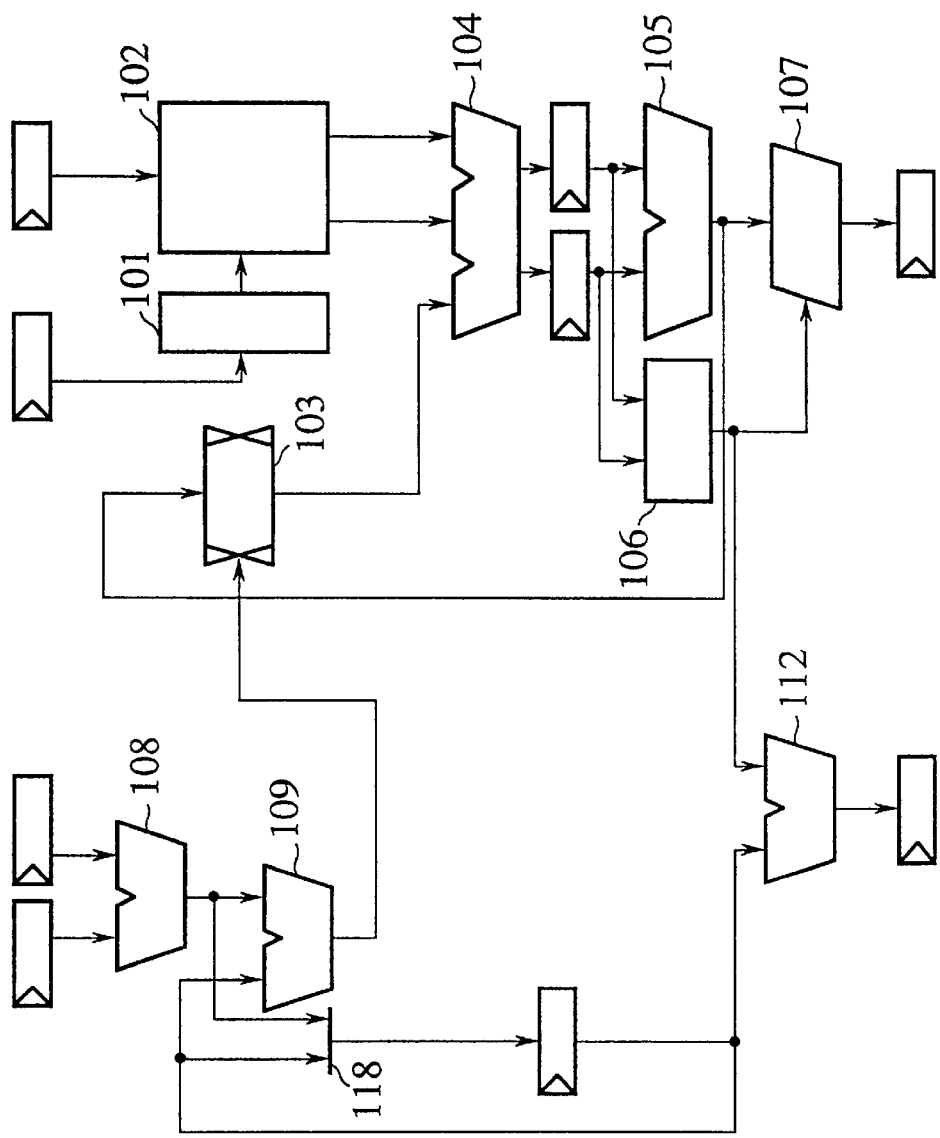
FIG. 15 is a block diagram showing a floating point multiply-add calculation unit according to the present invention.

One embodiment of a floating point multiply-add calculation unit in the present invention will next be explained with reference to the drawings. FIG. 15 is a block diagram showing the floating point multiply-add calculation unit according to the present invention. For example, the floating point multiply-add calculation unit according to the present invention is applied to the arithmetic units 631 to 634 in FIG. 11.

This floating point multiply-add calculation unit has multiplying means 101, 102 for calculating a product of first and second operands, and also has a digit-aligning means 103 for inputting a shifting amount as a digit number for digit alignment and digit-aligning the results of a third operand or a preceding arithmetic calculation and multiplied results calculated by the multiplying means 101, 102. The floating point multiply-add calculation unit also has an adding means 104 for calculating a sum of the multiplied results and the digit-aligned results of the digit-aligning means 103 and making a multiply-accumulation operation. The floating point multiply-add calculation unit also has a normalizing means 107 for normalizing a mantissa of multiply-add calculation results of the adding means 104, and an exponent part arithmetic means 108 for calculating an exponent of the product of the first and second operands. The floating point multiply-add calculation unit also has a shifting amount calculating means 109 for calculating a shifting amount of the third operand or the preceding calculation results and outputting the shifting amount to the digit-aligning means 103. The floating point multiply-add calculation unit further has an exponent part normalizing arithmetic means 112 for normalizing an exponent part of the multiply-add calculation results.

Figure 16:
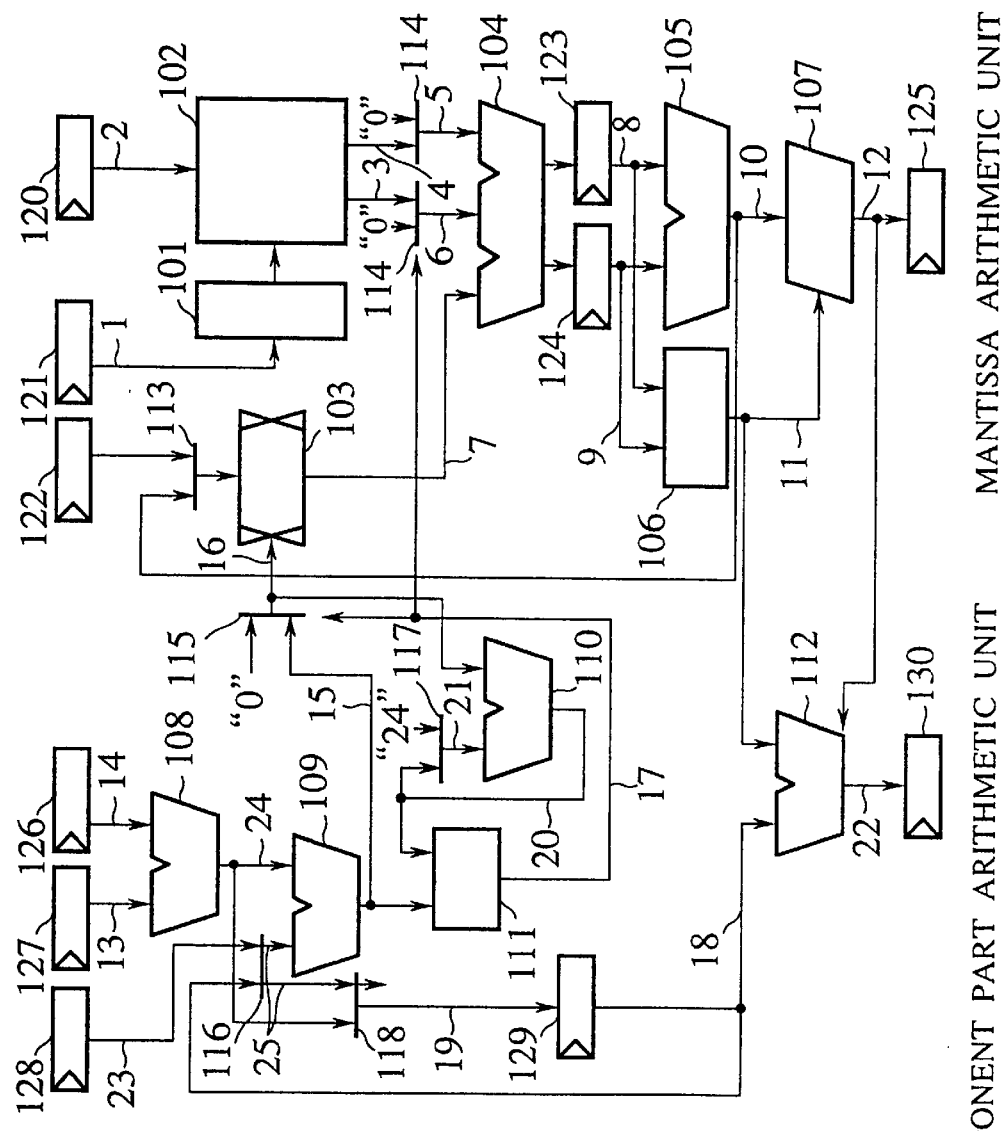
FIG. 16 is a block diagram showing a floating point multiply-add calculation unit in an embodiment of the present invention.

FIG. 16 is a block diagram showing the construction of a floating point multiply-add calculation unit in this embodiment. The construction of the floating point multiply-add calculation unit in this embodiment will next be explained with reference to FIG. 16. FIG. 16 shows a mantissa arithmetic section and an exponent part arithmetic section of a 32-bit single precision floating point multiply-add calculation unit. In this embodiment, the arithmetic unit is constructed by a pipe line at two stages. Here, a numerical format of the 32-bit single precision is formed in accordance with an IEEE754-85 floating point arithmetic standard.

The construction of a fixed point arithmetic unit will first be explained. Reference numerals 101 and 102 designate multiplication tree for inputting mantissas (signal lines 1, 2) of first and second operands and outputting multiplied results (signal lines 3, 4) of the mantissas. The multiplication tree is constructed by a decoder 101 of a booth and a Wallace Tree 102. The multiplied results are calculated as a sum component (signal line 3) of 48 bits and a carry component (signal line 4) in a carry save form format. A shifter 103 is a bidirectional shifter of 75 bits for digit-aligning multiply-add results (signal line 10) or a third operand. A selecting circuit 114 clears the multiplied results (signal lines 3, 4) to 0 when digit-aligned results are shifted out. A CSA (Carry Save Adder) 104 of three inputs adds the multiplied results (signal lines 5, 6) and the digit-aligned results (signal line 7) to each other as a sum component (signal line 8) and a carry component (signal line 9). A selecting circuit 113 selects either of the preceding calculation results and a value read from a register as a third operand. The first stage has the above construction.

An adder 105 is a CLA (Carry Look ahead Adder) of 75 bits which adds the sum component (signal line 8) and the carry component (signal line 9) calculated by the adder 104 to each other so that a multiply-add result (signal line 10) is calculated. Reference numeral 106 designates a leading zero absolutor (LZA: Leading Zero Absoluter) of 75 bits. The leading zero absolutor 106 detects '1' located on a most significant bit (MSB) side in the multiply-add result (signal line 10) and calculates the number of shifts required to normalize the multiply-add result (signal line 10). This processing is executed in parallel with the adding processing in the adder 105. A shifter 107 is a left-hand directional shifter of 50 bits for normalizing the multiply-add result (signal line 10) and calculating normalized accumulated results (signal line 12). The second stage has the above construction.

The construction of the exponent part arithmetic unit will next be explained. Reference numeral 108 designates an adder of 9 bits for calculating the value of an exponent part (signal line 24) of a product of the first and second operands from exponent parts (signal lines 13, 14) of the first and second operands. Reference numeral 109 designates a subtracter of 10 bits for calculating a shifting direction required to align digits of mantissas and the number of shifts (signal line 15). Reference numeral 110 designates a subtracter of 10 bits for calculating a shiftable maximum bit number (signal line 20) in the digit alignment of the mantissas. The shiftable maximum bit number is a maximum bit number for shifting out no most significant bit (MSB) from the digit-aligning shifter 103 when the mantissas are shifted by a digit-aligning shift. Reference numeral 111 designates a comparator of 10 bits. This comparator detects that a shifting amount (signal line 15) for the digit alignment calculated by the subtracter 109 lies within the maximum shift number (signal line 20) calculated by the subtracter 110. If the shifting amount is larger than the maximum shift number, the comparator asserts a signal line 17. A selecting circuit 116 selects either of a preceding calculation result (signal line 18) and a value (signal line 23) read from a register as a third operand. A selecting circuit 118 selects an exponent value of multiply-add calculation results. An exponent value (signal line 25) of the third operand is selected when the product of the first and second operands (signal lines 13, 14) is shifted out in the digit alignment with the third operand (signal line 23) (when the signal line 17 is asserted). Reference numeral 112 designates a subtracter of 10 bits for normalizing an exponent part of the accumulated results.

An operation of the multiply-add calculation unit in this embodiment will next be explained. This multiply-add calculation unit calculates a multiply-add, i.e., R=A×B+C. Here, it should be noted that this multiply-add calculation unit is operated as an adder-subtracter by setting A or B to '1' and is operated as a multiplier by setting C to '0'. Here, the operation of the multiply-add calculation unit will first be explained when the multiply-accumulation operation is independently executed. The selecting circuits 113 and 116 select a value read from a register as a third operand.

At a first stage, mantissas of operands A and B are inputted to the multiplication tree 101 and 102 as first and second operands (signal lines 1, 2), and multiplied results (signal lines 3, 4) of the mantissas are outputted. These multiplied results are calculated as a sum component (signal line 3) and a carry component (signal line 4) of 48 bits in a carry save form format. In contrast to this, a mantissa of the third operand C is inputted to the shifter 103 and digit-aligning processing of the mantissa is performed to add this mantissa to the first and second multiplied results. An aligned digit number (shift bit number) and a digit-aligning direction (shifting direction) are calculated by the subtracter 109 as a difference (signal line 15) provided by subtracting an exponent (signal line 25) of the third operand C from a sum (signal line 24) of exponents of the first and second operands A and B calculated by the adder 108. The shift bit number is an absolute value of the subtracted value. When this difference (signal line 15) is negative, the exponent of the third operand is greater than the exponent sum so that a left-hand shift is set. In contrast to this, when this difference (signal line 15) is positive, the exponent of the third operand is smaller than the exponent sum so that a right-hand shift is set. This difference (signal line 15) is compared with the maximum shift number (signal line 20) in the exponent part comparator 111. When this difference is greater than the maximum shift number (signal line 20), it shows that a mantissa of the product of the first and second operands A and B is equal to or smaller than an effective digit number (as a result of the digit alignment, the mantissa is shifted out). Thus, the selecting circuits 114 and 115 select '0' (no value is added to the third operand since the mantissa is shifted out). Mantissas (signal lines 5, 6, 7) of the three operands are calculated as a sum component and a carry component of 72 bits in the carry save form format by a CSA adder 4 and are stored to pipeline registers 123 and 124.

At a second stage, the sum component (signal line 8) and the carry component (signal line 9) stored to the pipeline registers 123 and 124 are added by the adder 105. A shift number (signal line 11) for normalization is also calculated by the leading zero anticipation circuit 106 in parallel with the adding calculation. This shift number (signal line 11) is inputted to the digit-aligning shifter 107 and a mantissa is normalized. The shift number (signal line 11) is also inputted to the subtracter 112 and an exponent part is normalized. The above operation is performed when the multiply-accumulation operation is independently executed.

The operation of the multiply-add calculation unit will next be explained when the multiply-accumulation operation is continuously made. It is assumed that the multiply-accumulation operation is already executed by one cycle before. Each of the selecting circuits 113 and 116 selects a calculation intermediate value of a preceding arithmetic calculation (signal lines 10, 18) as a third operand. Mantissas of the first and second operands are inputted to multiplication tree 101, 102 as first and second operands (signal lines 1, 2) and multiplied results (signal lines 3, 4) of the mantissas are outputted. These multiplied results are calculated as a sum component (signal line 3) and a carry component (signal line 4) of 48 bits in a carry save form format. In contrast to this, a mantissa (signal line 10) of the preceding calculation intermediate value is inputted to the shifter 103 and digit-aligning processing of the mantissa is performed to add the mantissa to the first and second multiplied results. Here, the intermediate value relative to the signal line 10 is an intermediate result of the preceding multiply-accumulation operation, i.e., an adding result before a normalizing shift. In this embodiment, as shown in FIG. 16, data are transferred from the latter half of the second stage of the preceding multiply-accumulation operation to the first stage of the multiply-accumulation operation executed at present. Thus, an accumulating arithmetic calculation can be started and executed every clock. This is because a time required to calculate the product of the first and second operands is longer than a time required to perform a digit-aligning shift and a final adding calculation. An aligned digit number (shift bit number) and a digit-aligning direction (shifting direction) are calculated by the subtracter 109 as a difference (signal line 15) obtained by subtracting the value (signal line 18) of an exponent prior to normalization of the preceding multiply-accumulation operation from a sum (signal line 24) of exponents of the first and second operands calculated by the adder 108. The shift bit number is an absolute value of the difference (signal line 15). Here, when the difference (signal line 15) is negative, the accumulating result is larger so that a left-hand shift is set. In contrast to this, when the difference (signal line 15) is positive, a right-hand shift is conversely set. This difference (signal line 15) is compared with a maximum shift number in the exponent part comparator 111. When this difference value (signal line 15) is greater than the maximum shift number (signal line 20), it shows that the product of the first and second operands is equal to or smaller than an effective digit number of the mantissa (as a result of the digit alignment, the mantissa is shifted out). The maximum shift number (signal line 20) shows a range in which no most significant bit (MSB) is shifted out from the effective digit number as a result of the digit-aligning shift. This value is obtained by subtracting a shifting amount (signal line 16) of the digit alignment provided by the preceding multiply-accumulation operation from a maximum shifting amount (signal line 21) of the preceding multiply-accumulation operation (an initial value=24 (an effective bit number of the mantissa is set to 24 since this example shows a single precision number)) by the subtracter 110. When the value relative to the signal line 15 is greater than the maximum shifting amount (signal line 20), the selecting circuits 114 and 115 select '0'. Mantissas (signal lines 5, 6, 7) of the three operands are calculated as a sum component and a carry component of 72 bits in the carry save form format by the CSA adder 104 and are stored to pipeline registers 123 and 124.

At a second stage, the sum component (signal line 8) and the carry component (signal line 9) stored to the pipeline registers 123 and 124 are added to each other by the adder 105. This added value is bypassed to the first stage of a subsequent multiply-add instruction as the third operand (signal line 10) of a subsequent multiply-accumulation operation within the same stage. A normalized shift number (signal line 11) is also calculated by the leading zero anticipation circuit 106 in parallel with this adding calculation. This shift number (signal line 11) is inputted to the digit-aligning shifter 107 and a mantissa is normalized. An exponent value (signal line 18) prior to the normalization is bypassed to the first stage of a subsequent instruction as the third operand of a subsequent multiply-accumulation operation and is also inputted to the subtracter 112 and an exponent part is normalized.

The above explanation relates to processes of the multiply-accumulation operation. Thus, in the present invention, preceding first calculation results prior to normalization are provided as the operand of a subsequent second multiply-accumulation operation. Accordingly, shifting processing in the normalization by a first calculation and shifting processing in digit alignment of the second multiply-accumulation operation are simultaneously performed so that a continuous multiply-accumulation operation is processed at high speed.

In the above explanation, adding and subtracting calculations can be executed if the second operand is set to '1'. A multiplying calculation can be executed if the third operand is set to '0'.

The calculating process of an inner product will next be explained sequentially with reference to FIGS. 17A and 17B with a program sequence for calculating a concrete inner product as an example.

For example, the following inner product

A×B+D×E+F×G can be efficiently calculated if an accumulating calculation is made. Namely, this inner product calculation can be realized by using multiplying and multiply-accumulation operations as shown by an instruction sequence in FIG. 17A. First, a first instruction MULA is realized by executing a third operand of the multiply-accumulation operation as 0. Next, a second instruction MAC is executed with D and E as first and second operands and a preceding multiplied result of MULA as a third operand. As shown in FIG. 16, the preceding multiplied result of MULA is bypassed from the second stage to the first stage of the second instruction MAC executed at present. Further, a third instruction MAC is executed with F and G as first and second operands and a preceding multiply-add result of the second instruction MAC as a third operand. In this case, the preceding multiply-add result of the second instruction MAC is also bypassed from the second stage to the first stage of the MAC instruction executed at present as shown by the timing chart of FIG. 17B.

As mentioned above, the multiply-accumulation operation can be efficiently executed in accordance with this embodiment. In particular, a multiply-accumulation operation having a dependent relation can be continuously executed every clock, i.e., can be executed in throughput 1 although this multiply-accumulation operation cannot be conventionally executed continuously.

As explained above, the following effects are obtained in accordance with the present invention.

Namely, in comparison with the conventional system, it is possible to provide a graphic translate engine (GTE) in which (1) data are efficiently transferred between a memory unit of graphic data and the graphic translate engine, (2) an inner product calculation caused by a matrix calculation for performing a perspective transformation and a divisional calculation by 'depth' are made, and (3) clamping processing of red (R), green (G) and blue (B) brightnesses in light irradiating processing is executed at high speed.

Further, before a multiply-add result is normalized, this multiply-add result is used as an operand for addition of a subsequent multiply-accumulation operation. Thus, it is possible to provide a floating point multiply-add calculation unit capable of shortening a processing time of a continuous multiply-accumulation operation and particularly provide a multiply-add calculation unit capable of starting execution of a dependent multiply-accumulation operation and terminating the dependent multiply-accumulation operation every clock.

It should be understood that many modifications and adaptations of the invention will become apparent to those skilled in the art and it is intended to encompass such obvious modifications and changes in the scope of the claims appended hereto.

What is claimed is:

1. A graphic translate engine for performing a predetermined geometrical arithmetic processing with respect to vertex data of a figure stored to an external memory unit, the graphic translate engine comprising:

an internal memory section divided into first and second memory blocks and capable of inputting and outputting data every memory block;

a data holding section for temporarily storing one portion of said vertex data stored in said internal memory section; and an arithmetic section for receiving the vertex data stored in the data holding section and generating graphic data by performing predetermined processing of the vertex data, and outputting the graphic data to said data holding section;

wherein during a period of time, the first memory block of said internal memory section is connected to said external memory unit and the second memory block thereof is connected to said data holding section and the first memory block outputs the graphic data to said external memory unit and then receives the vertex data from said external memory unit while the second memory block outputs the vertex data to said data holding section and then receives the graphic data from said data holding section, wherein, during a succeeding period of time, the first memory block is connected to said data holding section and the second memory block is connected to said external memory unit and the second memory block outputs the graphic data to said external memory unit and then receives the vertex data from said external memory unit while the first memory block outputs the vertex data to said data holding section and then receives the graphic data from said data holding section, and wherein the alternative connection is repeated.

2. A graphic translate engine comprising:

multiply-add calculation units for making a multiply-accumulation operation of x, y and z corresponding to x, y and z;

at least one divider;

first, second and third register files for storing vertex data of a figure corresponding to x, y and z;

a first bus network for connecting each first reading port of said first, second and third register files with a corresponding input terminal for a first operand of said multiply-add calculation units and said divider, and supplying first operand data to said multiply-add calculation units and said divider;

a second bus network for connecting, by a crossbar switch included therein, each second reading port of said first, second and third register files with each input terminal for a second operand of said multiply-add calculation units and said divider in a one-to-one corresponding manner in which each register file is exclusively connected to any one of said multiply-add calculation units and said divider or in a one-to-multiple corresponding manner in which one of said first, second and third register files is connected to two or more than two of said multiply-add calculation units and said divider, and for supplying second operand data to said multiply-add calculation units and said divider; and a third bus network for exclusively connecting each writing port of said first, second and third register files with any output terminal of said multiply-add calculation units and said divider, and writing back calculation results of said multiply-add calculation units and said divider to a predetermined address of said first, second and third register files.

3. The graphic translate engine as claimed in claim 2, further comprising:

a first bypass network for directly and respectively connecting output terminals of said first, second and third multiply-add calculation units and said divider to input terminals for first operands of said first, second and third multiply-add calculation units and said divider, and directly supplying calculation results of said first, second and third multiply-add calculation units and said divider to the input terminals for first operands of said first, second and third multiply-add calculation units and said divider as operands for said first, second and third multiply-add calculation units and said divider before the calculation results are written back to said first, second and third register files, or in parallel with the writing back processing; and a second bypass network for directly connecting the output terminals of said first, second and third multiply-add calculation units and said divider to said first and second bus networks, and directly supplying calculation results of said first, second and third multiply-add calculation units and said divider to the input terminals for first or second operands of said first, second and third multiply-add calculation units as operands for said first, second and third multiply-add calculation units and said divider in parallel with processing for writing back the calculation results.

4. A graphic translate engine comprising:

multiply-add calculation units for making multiply-accumulation operation of x, y, z and w corresponding to x, y, z and w;

at least one divider;

first, second, third and fourth register files for storing vertex data of a figure corresponding to x, y, z and w;

a first bus network for connecting each first reading port of said first, second, third and fourth register files with a corresponding input terminal for a first operand of said multiply-add calculation units and said divider, and supplying first operand data to said multiply-add calculation units and said divider;

a second bus network for connecting, by a crossbar switch included therein, each second reading port of said first, second, third and fourth register files with each input terminal for a second operand of said multiply-add calculation units and said divider in a one-to-one corresponding manner in which each register file is exclusively connected to any one of said multiply-add calculation units and said divider or in a one-to-multiple corresponding manner in which one of said first, second, third and fourth register files is connected to two or more than two of said multiply-add calculation units and said divider, and for supplying second operand data to said multiply-add calculation units and said divider; and a third bus network for exclusively connecting each writing port of said first, second, third and fourth register files with any output terminal of said multiply-add calculation units and said divider, and writing back calculation results of said multiply-add calculation units and said divider to a predetermined address of said first, second, third and fourth register files.

5. The graphic translate engine as claimed in claim 4, further comprising:

a first bypass network for directly and respectively connecting output terminals of said first, second, third and fourth multiply-add calculation units and said divider to input terminals for first operands of said first, second, third and fourth multiply-add calculation units and said divider, and directly supplying calculation results of said first, second, third and fourth multiply-add calculation units and said divider to the input terminals for first operands of said first, second, third and fourth multiply-add calculation units and said divider as operands for said first, second, third and fourth multiply-add calculation units and said divider before the calculation results are written back to said first, second, third and fourth register files, or in parallel with the writing back processing; and a second bypass network for directly connecting the output terminals of said first, second, third and fourth multiply-add calculation units and said divider to said first and second bus networks, and directly supplying calculation results of said first, second, third and fourth multiply-add calculation units and said divider to the input terminals for first or second operands of said first, second, third and fourth multiply-add calculation units as operands for said first, second, third and fourth multiply-add calculation units and said divider in parallel with processing for writing back the calculation results.

6. A floating point multiply-add calculation unit for receiving first, second and third operands and calculating a multiply-add of these operands, the floating point multiply-add calculation unit comprising:

a multiplying section that calculates a product of said first and second operands;

a digit-aligning section that receives a shifting mount as information for a digit alignment and that digit-aligns said third operand or a preceding multiply-add calculation result with the product of said first and second operands according to the shift amount, said digit-aligning section digit-aligning said third operation upon a first multiply-add calculation and digit-aligning the preceding multiply-add calculation result upon second and succeeding multiply-add calculations;

an adding section that calculates a sum of the product of said first and second operands and the digit-aligned third operand or the digit-aligned preceding multiply-add calculation result;

a normalizing section that normalizes a mantissa of a multiply-add calculation result obtained through said adding section;

an exponent part arithmetic section that calculates an exponent of the product of said first and second operands;

a shifting amount calculating section that calculates a difference between the exponent of the product of the first and second operands and an exponent part of said third operand or an exponent part of the preceding multiply-add calculation as said shifting amount and that outputs said shifting amount to said digit-aligning section; and an exponent part normalizing arithmetic section that normalizes the exponent part of said preceding multiply-add calculation.

7. The floating point multiply-add calculation unit as claimed in claim 6, wherein said adding section transmits a calculation intermediate value of a current multiply-add calculation to said digit-aligning section as an operand of a succeeding multiply-add calculation prior to completion of the current multiply-add calculation so that the succeeding multiply-add calculation is started without waiting for termination of the current multiply-add calculation; and said digit-aligning section receives the intermediate value of the current multiply-add calculation as an operand of the succeeding multiply-add calculation after the succeeding multiply-add calculation is started.

8. A graphic translate engine for performing a predetermined geometrical arithmetic processing with respect to vertex data of a figure stored to an external memory unit, the graphic translate engine comprising the floating point multiply-add calculation unit claimed in claim 6.

9. A graphic translate engine for performing a predetermined geometrical arithmetic processing with respect to vertex data of a figure stored to an external memory unit, the graphic translate engine comprising the floating point multiply-add calculation unit claimed in claim 7.

* * * * *